United States Patent
Nakashita et al.

(10) Patent No.: US 9,852,746 B2
(45) Date of Patent: Dec. 26, 2017

(54) INFORMATION PROCESSING APPARATUS, METHOD OF CONTROLLING THE SAME, PROGRAM AND STORAGE MEDIUM

(71) Applicant: CANON KABUSHIKI KAISHA, Tokyo (JP)

(72) Inventors: Tsunahito Nakashita, Abiko (JP); Minoru Akazawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/038,664

(22) PCT Filed: Feb. 6, 2015

(86) PCT No.: PCT/JP2015/054049
§ 371 (c)(1),
(2) Date: May 23, 2016

(87) PCT Pub. No.: WO2015/122509
PCT Pub. Date: Aug. 20, 2015

(65) Prior Publication Data
US 2016/0307585 A1 Oct. 20, 2016

(30) Foreign Application Priority Data

Feb. 17, 2014 (JP) .................................. 2014-027861

(51) Int. Cl.
*G11B 20/12* (2006.01)
*G06F 11/14* (2006.01)
(Continued)

(52) U.S. Cl.
CPC .............. *G11B 5/024* (2013.01); *G11B 5/012* (2013.01); *G11B 5/02* (2013.01); *G11B 20/1217* (2013.01);
(Continued)

(58) Field of Classification Search
None
See application file for complete search history.

(56) References Cited

U.S. PATENT DOCUMENTS 6,052,346 A * 4/2000 Arataki ................ G11B 27/329
369/30.09
8,027,109 B1 9/2011 Lyman ........................... 360/13
(Continued)

FOREIGN PATENT DOCUMENTS

JP 2004-234473 A 8/2004
JP 2009-093242 A 4/2009

OTHER PUBLICATIONS

International Search Report and Written Opinion of the International Searching Authority dated May 6, 2015, issued by WIPO in connection with International Application No. PCT/JP2015/054049.

*Primary Examiner* — K. Wong
(74) *Attorney, Agent, or Firm* — Fitzpatrick, Cella, Harper & Scinto

(57) ABSTRACT

An information processing apparatus, for recording data in a magnetic storage medium by a shingled magnetic recording, and a method of controlling this, when a rewrite of data stored in the magnetic storage medium is instructed, copy data of a zone in which rewrite target data is stored other than the rewrite target data into a vacant zone of the magnetic storage medium; store, to the vacant zone into which the data is copied, the rewrite target data, delete by overwriting an entirety of the zone in which the rewrite target data is stored with predetermined data, and register the overwritten zone as an unused area.

14 Claims, 22 Drawing Sheets

(51) Int. Cl.
  *G11B 5/024* (2006.01)
  *G11B 5/012* (2006.01)
  *G11B 5/02* (2006.01)
  *G11B 27/036* (2006.01)
  *G11B 20/10* (2006.01)

(52) U.S. Cl.
  CPC .. *G11B 27/036* (2013.01); *G11B 2020/10851* (2013.01); *G11B 2020/10898* (2013.01); *G11B 2020/1238* (2013.01); *G11B 2020/1292* (2013.01)

(56) References Cited

U.S. PATENT DOCUMENTS

| | | | | |
|---|---|---|---|---|
| 8,654,472 B2 * | 2/2014 | Hall | ............... | G06F 3/061 |
| | | | | 360/55 |
| 8,681,443 B2 * | 3/2014 | Hall | ............... | G11B 5/012 |
| | | | | 360/43 |
| 9,236,066 B1 * | 1/2016 | Coker | ............... | G11B 20/1217 |
| 2009/0251818 A1 | 10/2009 | Dahiwadkar | ............... | 360/57 |
| 2012/0212847 A1 | 8/2012 | Sato et al. | ............... | 360/31 |
| 2012/0300325 A1 | 11/2012 | Hall | ............... | 360/15 |
| 2013/0170061 A1 | 7/2013 | Saito et al. | ............... | 360/39 |
| 2015/0228294 A1 * | 8/2015 | Ito | ............... | G11B 5/012 |
| | | | | 360/57 |

\* cited by examiner

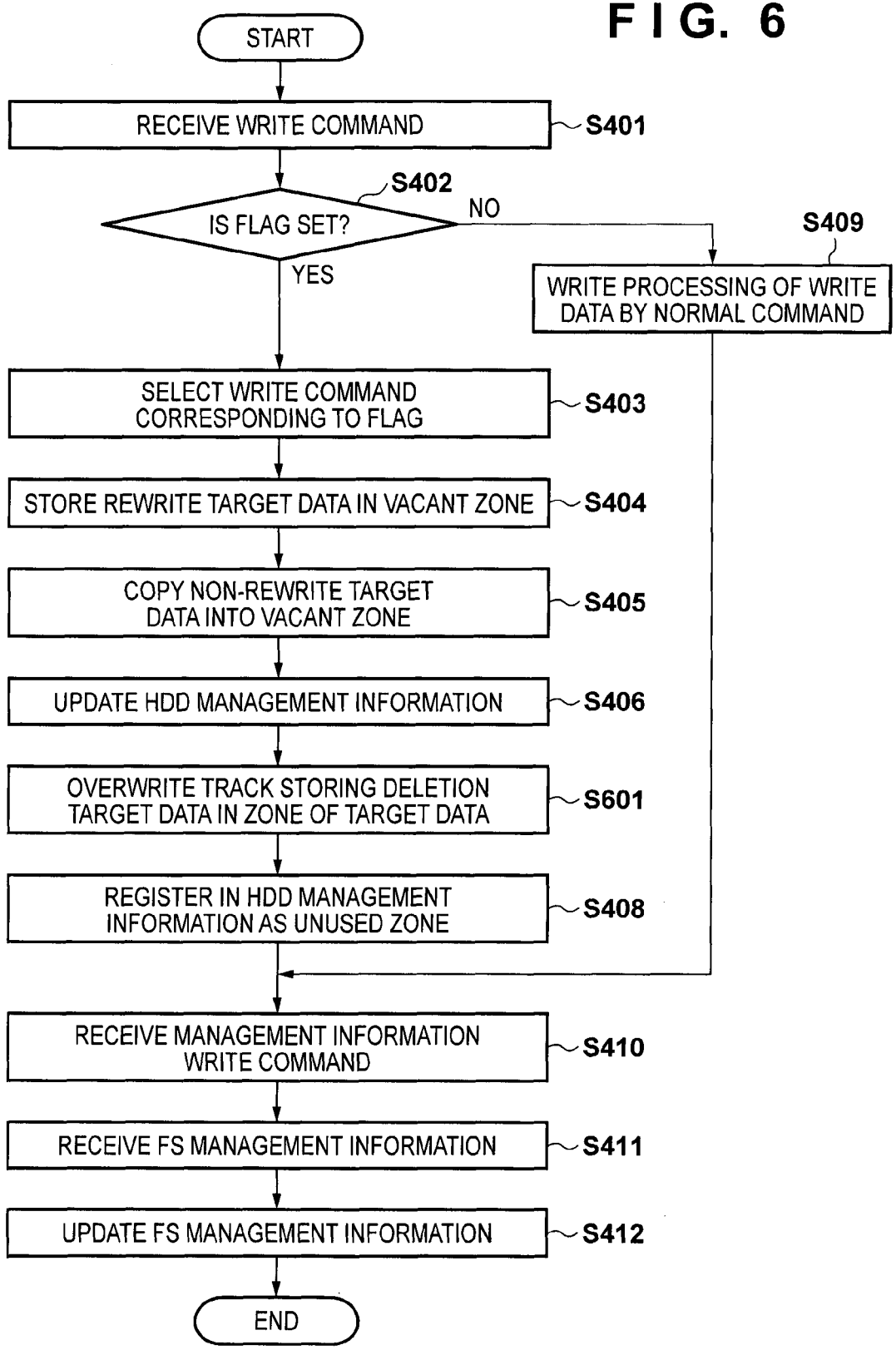

COPY NON-REWRITE TARGET DATA

UPDATE ADDRESS INFORMATION
IN HDD MANAGEMENT INFORMATION

OVERWRITE ONLY DELETION
TARGET TRACK WITH DUMMY DATA

REGISTER IN HDD MANAGEMENT INFORMATION
AS UNUSED AREA

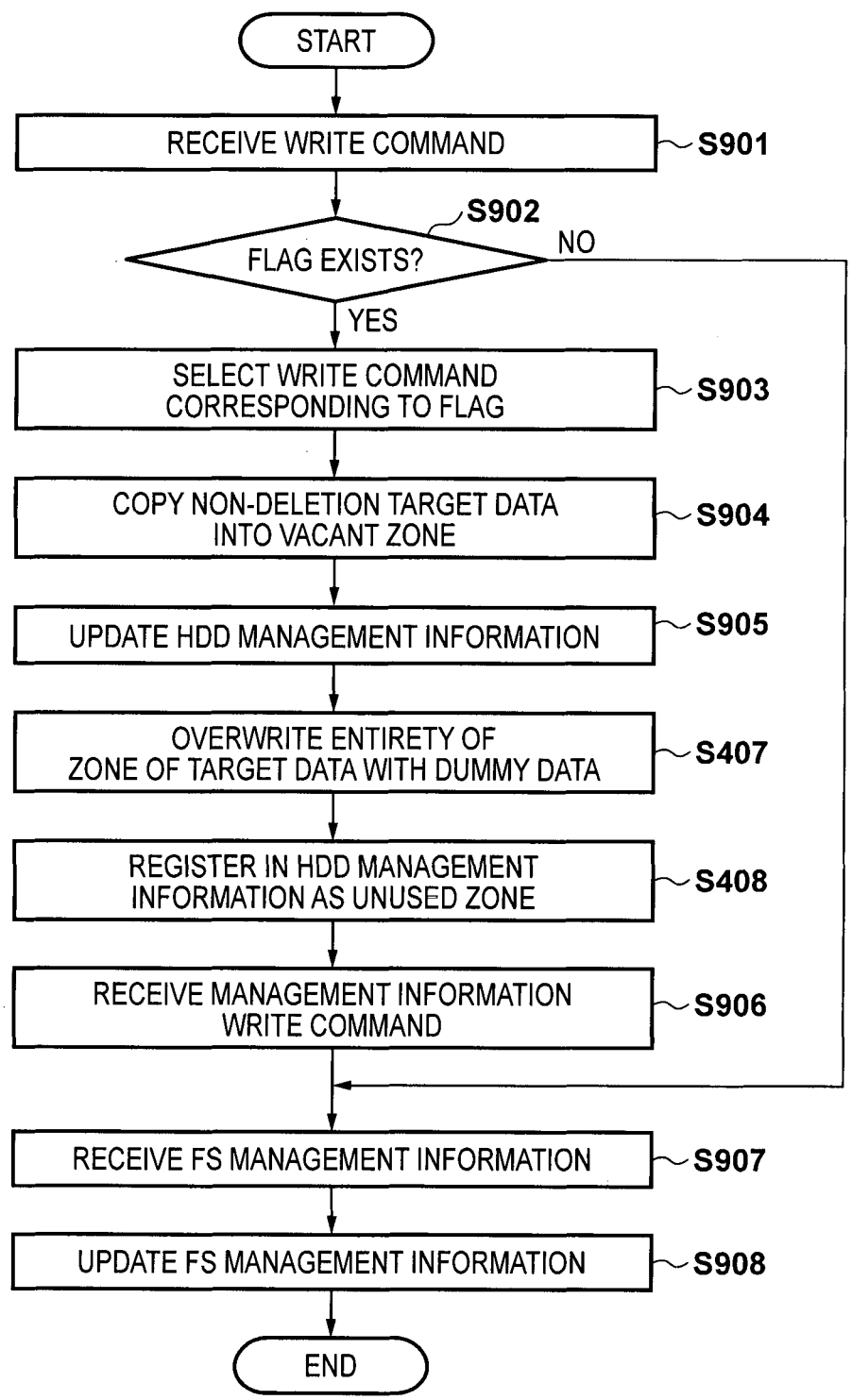

UPDATE ADDRESS INFORMATION IN HDD MANAGEMENT INFORMATION    OVERWRITE ONLY DELETION TARGET TRACK WITH DUMMY DATA

REGISTER IN HDD MANAGEMENT INFORMATION AS UNUSED AREA

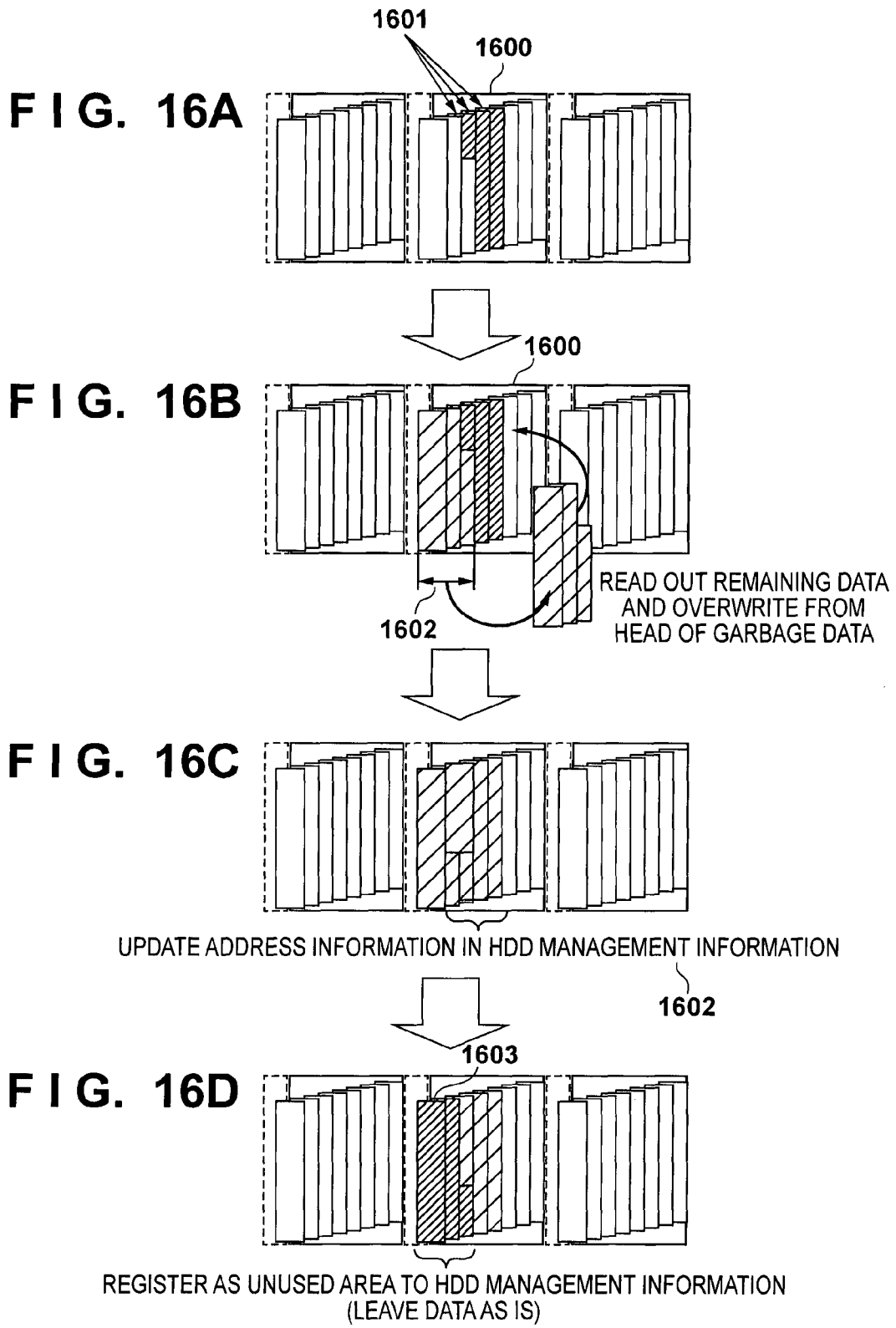

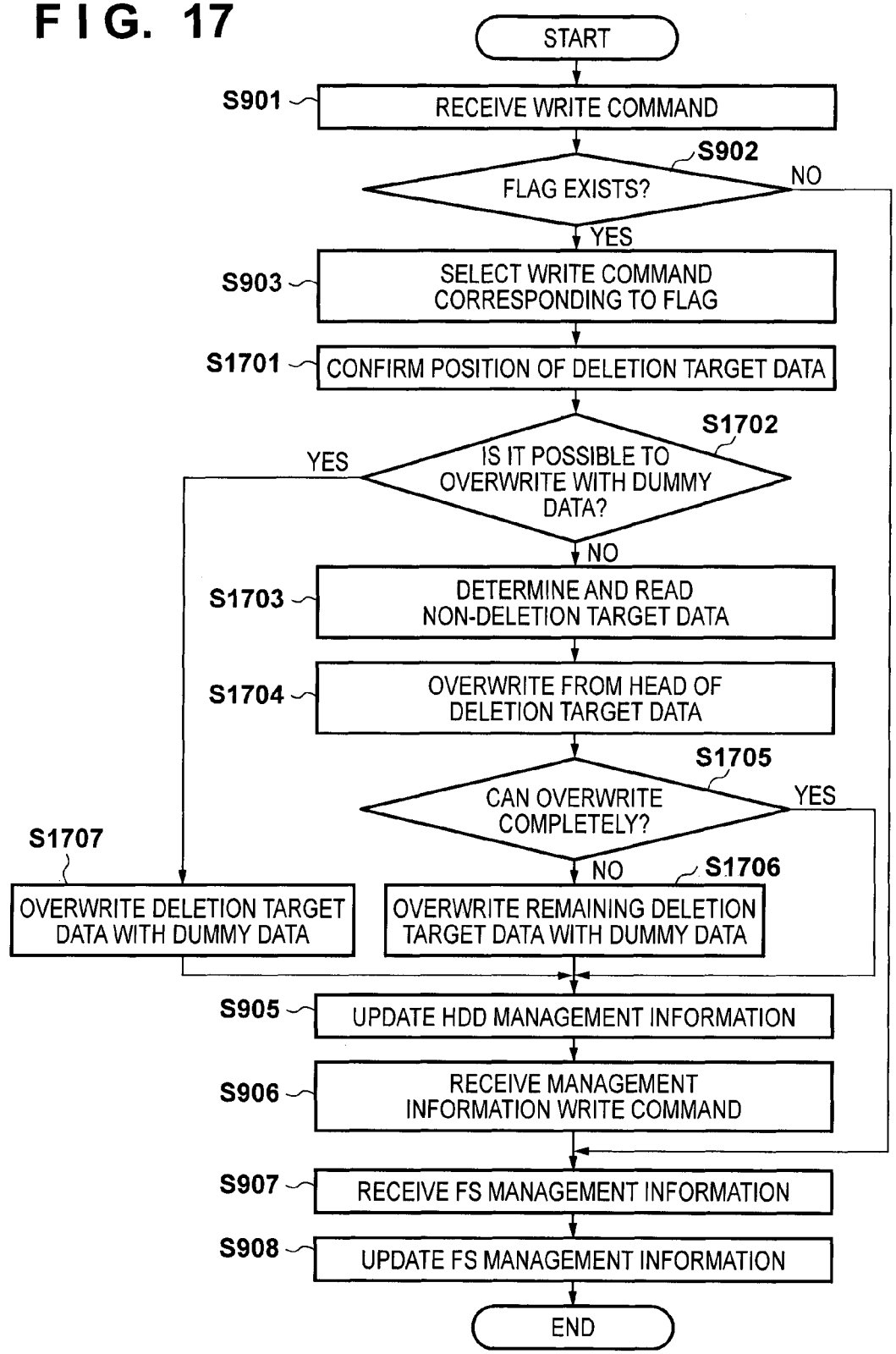

READ OUT DATA TO BE LEFT
AND OVERWRITE FROM HEAD
OF DELETION TARGET DATA

DELETE ALL DELETION TARGET DATA BY OVERWRITING
UPDATE ADDRESS INFORMATION IN HDD MANAGEMENT INFORMATION

REGISTER IN HDD MANAGEMENT
INFORMATION AS UNUSED AREA

DELETION TARGET DATA

READ OUT DATA TO BE LEFT AND OVERWRITE FROM HEAD OF DELETION TARGET DATA

1901

OVERWRITE WITH DUMMY DATA TRACKS FOR AMOUNT
THAT DELETION TARGET DATA IS LEFT OVER
UPDATE ADDRESS INFORMATION IN HDD MANAGEMENT INFORMATION

1901

REGISTER IN HDD MANAGEMENT INFORMATION AS UNUSED AREA

NON-DELETION TARGET DATA IS NOT OVERWRITTEN EVEN IF OVERWRITING WITH DUMMY DATA IS PERFORMED

ONLY OVERWRITE DELETION TARGET TRACK WITH DUMMY DATA

REGISTER IN HDD MANAGEMENT INFORMATION AS UNUSED AREA

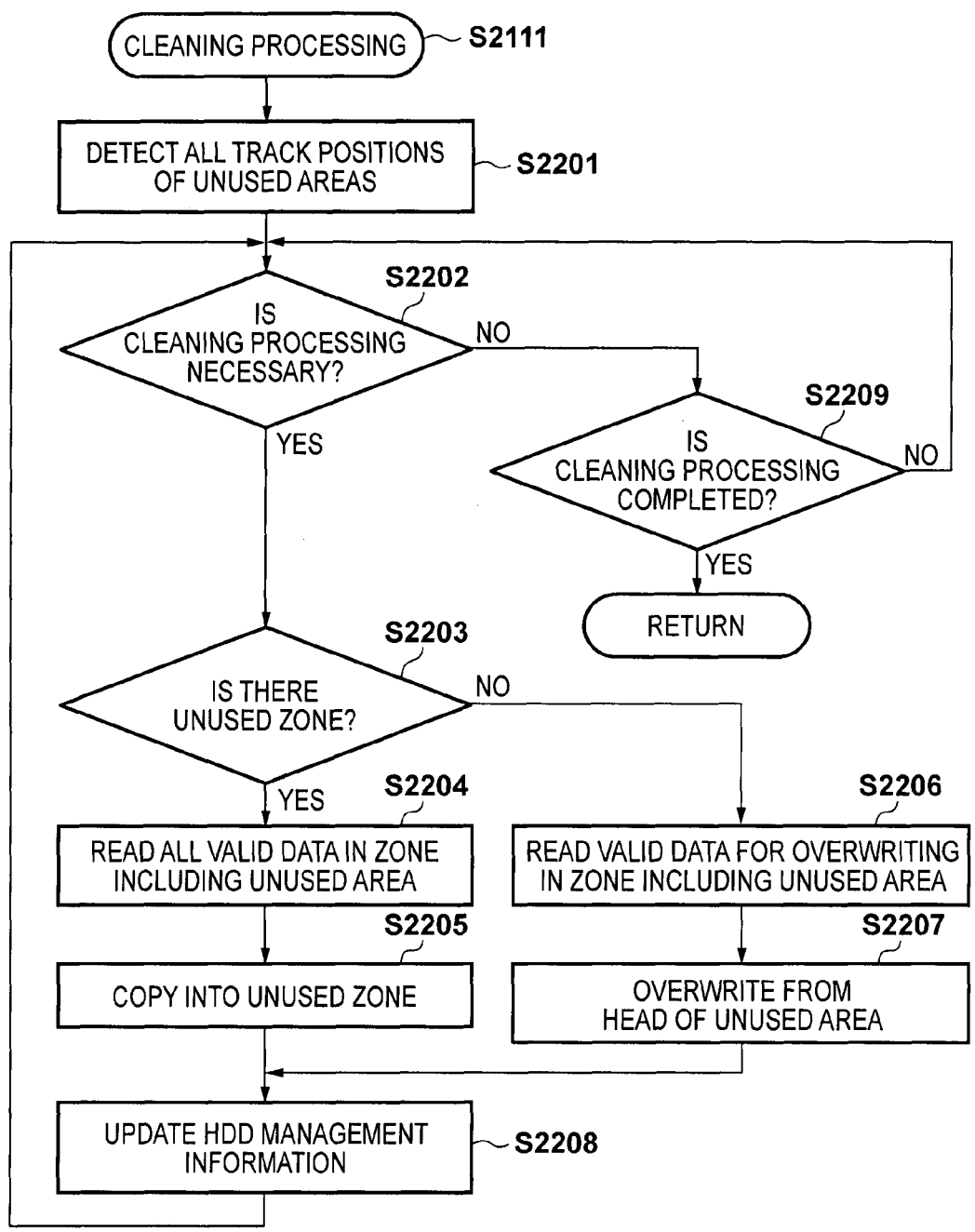

INFORMATION PROCESSING APPARATUS, METHOD OF CONTROLLING THE SAME, PROGRAM AND STORAGE MEDIUM

TECHNICAL FIELD

The present invention relates to an information processing apparatus, a method of controlling the same, a program, and a storage medium.

BACKGROUND ART

Conventionally, HDDs (hard disk drives) are mounted in image forming apparatuses, and in addition to storing programs, HDDs are provided with a storage function for performing image data saving, editing, or the like. In current 3.5 inch HDDs, there are those in circulation that have a storage capacity of 1 terabyte for one disk, and with a PMR (Perpendicular Magnetic Recording) method which is currently a mainstream recording method, a limit on recording density will be reached soon.

Since, due to a rapid increase in the amount of information handled by electronic devices in recent years, demand for mounting a large capacity storage device is rising, an SMR (Shingled Magnetic Recording) format has been proposed as a recording method for exceeding the limit of the PMR method. The SMR method is a method in which signals are recorded in new tracks that overlap part of the previously recorded magnetic tracks as in the case of laying roof shingles. In the SMR method, a track group comprising a plurality of adjacent recording tracks (hereinafter referred to as a zone) is defined as a recording unit. Accordingly, in recording, a random write of data as in the PMR method cannot be performed, and only a sequential write of data can be performed. In other words, upon deletion or updating of a portion of data recorded in a zone, new data is added to a vacant sector, and for an area, in which the deletion or update target data is stored, the area's address information is simply registered in management information as an unused area and the data stored in the area is left as it is. Accordingly, when zones including these kinds of areas increase, unused zones and zones to which addition of data is possible disappear. For this reason, because addition of data becomes impossible in spite of the fact that there are vacant areas (unused areas) on the magnetic disk, periodic cleaning processing is necessary.

Also, in the SMR method, a relationship between logical addresses and physical addresses, unlike in conventional methods, is not a one-to-one relationship, and link destinations change automatically in accordance with disk usage conditions, and address link conditions are managed by management information within the HDD.

Meanwhile, demand for security guarantees and for protection of privacy is very high, and there are cases in which there is a need for spool data and saved data recorded in a storage unit in an image forming apparatus to be completely deletable. To eliminate a residual magnetism when data that is saved in an HDD is deleted, a complete delete of data is performed by overwriting an area to which deletion target data is recorded a plurality of times with dummy data (for example, refer to Japanese Patent Laid-Open No. 2004-234473, and Japanese Patent Laid-Open No. 2009-093242).

However, because items of data are written to be overlapped in an HDD of the SMR method, it is impossible to overwrite only the data area desired to be deleted, and the relationship between physical addresses and logical addresses is not fixed. Accordingly, there is a problem in that processing, which has been performed in an HDD of conventional method, for deleting completely a deletion target data by overwriting the area of the deletion target data with dummy data a plurality of times cannot be performed.

Also, there is the possibility that if the above described cleaning processing is performed during processing such as continuous reading/writing, performance will deteriorate because the reading/writing processing will be made to wait during the cleaning processing. Also, similarly to a case in which a sufficient cache area cannot be allocated, the time required for the cleaning processing becomes longer, and performance deteriorates.

SUMMARY OF INVENTION

An aspect of the present invention is to eliminate the above-mentioned problems with conventional technology.

A feature of the present invention is to provide a technique for securing a vacant area in a magnetic storage medium of the SMR.

The present invention in its first aspect provides an information processing apparatus for recording data in a magnetic storage medium by a shingled magnetic recording, the apparatus comprising: copy means for, when a rewrite of data stored in the magnetic storage medium is instructed, copying data of a zone in which rewrite target data is stored other than the rewrite target data into a vacant zone of the magnetic storage medium; writing means for writing, to the vacant zone into which the copy means copied, the rewrite target data; overwriting means for overwriting an entirety of the zone in which the rewrite target data is stored with predetermined data; and registration means for registering the zone as an unused area.

The present invention in its second aspect provides an information processing apparatus for recording data in a magnetic storage medium by a shingled magnetic recording, the apparatus comprising: copy means for, when a rewrite of data stored in the magnetic storage medium is instructed, copying data of a zone in which rewrite target data is stored other than the rewrite target data into a vacant zone of the magnetic storage medium; writing means for writing, to the vacant zone into which the copy means copied, the rewrite target data; overwriting means for deleting by overwriting a track of the zone in which the rewrite target data is stored with predetermined data; and registration means for registering the track as an unused area.

The present invention in its third aspect provides an information processing apparatus for recording data in a magnetic storage medium by a shingled magnetic recording, the apparatus comprising: copy means for, when a deletion of data stored in the magnetic storage medium is instructed, copying data of a zone in which deletion target data is stored other than the deletion target data into a vacant zone of the magnetic storage medium; overwriting means for deleting by overwriting an entirety of the zone in which the deletion target data is stored with predetermined data; and registration means for registering the zone as an unused area.

The present invention in its fourth aspect provides an information processing apparatus for recording data in a magnetic storage medium by a shingled magnetic recording, the apparatus comprising: copy means for, when a deletion of data stored in the magnetic storage medium is instructed, copying data of a zone in which deletion target data is stored other than the deletion target data into a vacant zone of the magnetic storage medium; overwriting means for deleting by overwriting a track of the zone in which the deletion target data is stored with predetermined data; and registration means for registering the track as an unused area.

The present invention in its fifth aspect provides an information processing apparatus for recording data in a magnetic storage medium by a shingled magnetic recording, the apparatus comprising: reading means for, when a deletion of data stored in the magnetic storage medium is instructed, reading non-deletion target data other than deletion target data stored after the deletion target data within a zone in which the deletion target data is stored; overwriting means for overwriting from a head of the deletion target data with the non-deletion target data read by the reading means; registration means for registering, as an unused area, an area after an area within the zone in which the overwriting means has overwritten with the non-deletion target data.

The present invention in its sixth aspect provides an information processing apparatus for recording data in a magnetic storage medium by a shingled magnetic recording, the apparatus comprising: reading means for, when a deletion of data stored in the magnetic storage medium is instructed, reading non-deletion target data other than deletion target data stored after the deletion target data within a zone in which deletion target data is stored; overwriting means for overwriting from a head of the deletion target data with the non-deletion target data read by the reading means; registration means for registering, as an unused area, an area after an area within the zone in which the overwriting means has written with the non-deletion target data.

The present invention in its seventh aspect provides a method of controlling an information processing apparatus for recording data in a magnetic storage medium by a shingled magnetic recording, the method comprising: a copy step of, when a rewrite of data stored in the magnetic storage medium is instructed, copying data of a zone in which rewrite target data is stored other than the rewrite target data into a vacant zone of the magnetic storage medium; a writing step of storing, to the vacant zone into which the data is copied in the copy step, data that is rewritten; an overwriting step of overwriting an entirety of the zone in which the rewrite target data is stored with predetermined data; and a registration step of registering the zone as an unused area.

Further features of the present invention will become apparent from the following description of exemplary embodiments with reference to the attached drawings.

Note, in the accompanying drawings, the same reference numerals are added for same or similar configuration elements.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 6 is a flowchart for describing processing of the controller of the HDD according to a second embodiment of the invention.

FIG. 9 is a flowchart for describing processing of the controller of the HDD according to the third embodiment.

FIGS. 16A-16D depict views for describing cleaning processing in a case where there is not a vacant zone.

FIG. 17 is a flowchart for describing processing of the controller according to a fifth embodiment of the invention.

FIG. 22 is a flowchart for describing cleaning processing of step S2111 in FIG. 21.

DESCRIPTION OF EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that in the present embodiment, the information processing apparatus of the present invention is explained with the example of an image forming apparatus, which may be a multi-function peripheral, for example, but it goes without saying that the present invention is not limited to this kind of image forming apparatus.

Figure 1:
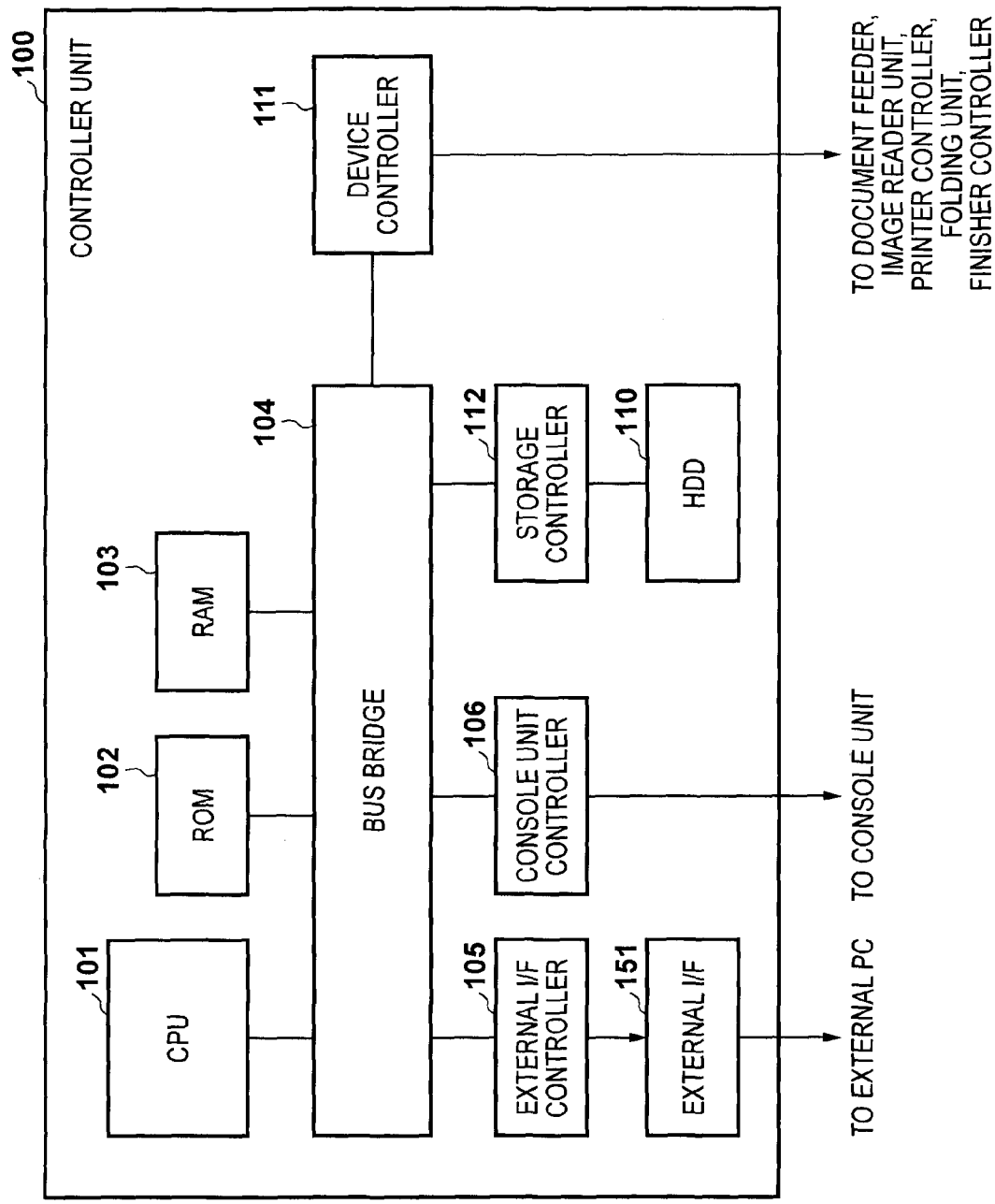
FIG. 1 is a block diagram for describing a configuration of a controller unit of an image forming apparatus according to embodiments of present invention.

FIG. 1 is a block diagram for describing a configuration of a controller unit 100 of an image forming apparatus according to embodiments.

The controller unit 100 communicates with a document feeder (not shown) for controlling a conveyance of a document or an image reader (not shown) based on an instruction from a console unit or an external computer (both not shown), and obtains image data of a document from the image reader. Also, it communicates with a printer controller (not shown) for controlling a printer unit (not shown), and image data is printed on a sheet by the printer unit. Also, the controller unit 100 communicates with a folding unit (not shown) or a finisher controller (not shown) for controlling a finisher, and desired post-processing such as a staple or a punch hole is performed on a printed sheet.

An external I/F 151 is an interface for connecting to an external computer through a network, or the like. In a case where the external I/F 151 receives print data from an external computer through an external bus such as, for example, a USB, or from a network, a CPU 101 deploys the print data into image data and prints it. Also, the external I/F 151 is used for transmitting image data stored in a hard disk drive 110 explained later (hereinafter referred to as HDD) to an external computer. The CPU 101 reads out an activation program from a ROM 102 which stores the initial start-up program of the CPU 101 through a bus bridge 104, executes the program, and deploys an OS or a program stored in the HDD 110 into a RAM 103. The RAM 103 is used as a deploying area for a program of the CPU 101 or a work area for a calculation accompanying controlling. A storage controller 112 for controlling a storage device such as the HDD 110 is also connected to the bus bridge 104.

The HDD 110 stores a main program of the CPU 101 including an OS, and is used as a storage destination for image data obtained by an image reader or the external I/F 151, or an application program for saving when an image is edited by a console unit. Also, the HDD 110 is used for a storage destination of an application program or user preference data. The HDD 110 is accessed from the CPU 101 through the bus bridge 104 and the storage controller 112. Also, an external I/F controller 105 for controlling a network or a USB interface and a console unit controller 106 for controlling a console unit are connected to the bus bridge 104. A document feeder, an image reader, a printer controller, a folding unit, a finisher controller, or the like, are connected to a device controller 111, and they are controlled by the CPU 101.

Next, operation of the HDD 110 according to this embodiment is described in detail below.

Figure 2:
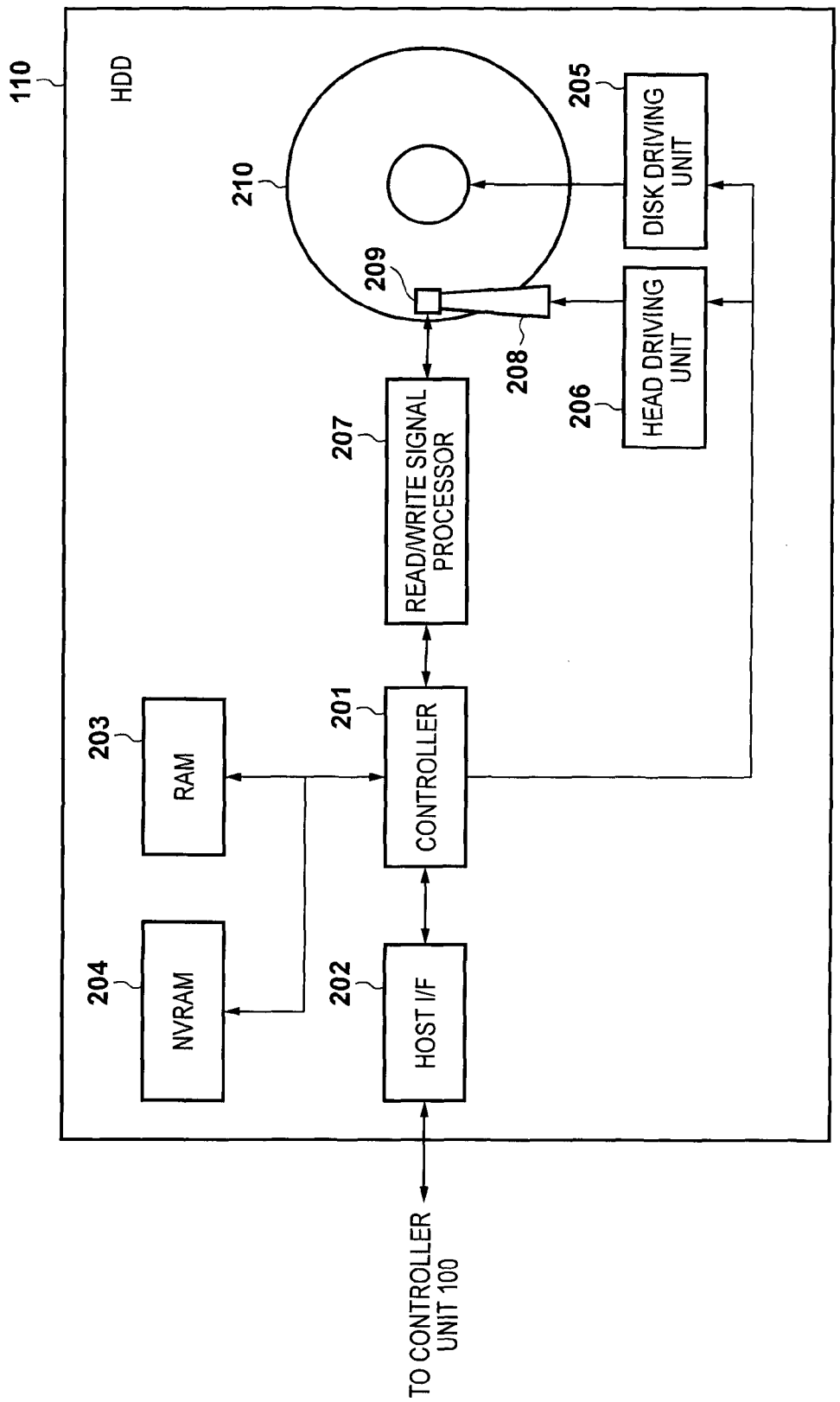
FIG. 2 is a block diagram for explaining an internal configuration of an HDD according to embodiments.

FIG. 2 is a block diagram for describing an internal configuration of the HDD 110 according to embodiments.

The HDD 110 comprises a controller 201, a host I/F 202, a RAM 203, an NVRAM (non-volatile RAM) 204, a disk driving unit 205, a head driving unit 206, a read/write signal processor 207, an arm 208, a magnetic head 209, and a magnetic disk (a magnetic storage medium) 210. The controller 201 performs operational control of the HDD 110 on the whole, as well as processing and controlling of input/output signals. The host I/F 202 is a unit for connecting and communication between the HDD 110 and the controller unit 100. In the present embodiment, the host I/F 202 is assumed to be a serial ATA (hereinafter referred to as SATA) interface. The RAM 203 is a volatile memory device mainly used as a work area for the controller 201 and a primary storage area for read/write data. The NVRAM 204 is a non-volatile memory device for storing firmware for the controller 201 and recording specific data or a setting value of the HDD 110 and log data, or the like. The disk driving unit 205 causes the magnetic disk 210 to rotate by supplying a driving signal to a spindle motor (not shown) that causes the magnetic disk 210 to rotate. The head driving unit 206 supplies a driving signal to a voice coil motor (not shown) for causing the magnetic head 209 to move to a recording surface of the magnetic disk 210 through the arm 208. The read/write signal processor 207 converts a read signal that is read in from the magnetic disk 210 into a digital signal, and outputs the digital signal to the controller 201. Also, the read/write signal processor 207 receives an analog signal converted from data received through the host interface 202 by the controller 201 and outputs the analog signal to the magnetic head 209 through an amplifier (not shown) so that the data is written to the magnetic disk 210.

Here, the controller 201 of the HDD 110 manages HDD management information for recording internal information of the HDD 110. The HDD management information recorded and stored in the RAM 203, the NVRAM 204, or the magnetic disk 210, which are storage mediums of the HDD 110, or a plurality of storage mediums. However, because the information stored in the RAM 203 disappears if a power supply is disconnected, in a case where the RAM 203 stores the information, it is necessary to store the information in parallel in the NVRAM 204 or the magnetic disk 210, which are non-volatile storage mediums.

Also, in addition to the HDD management information, there is FS management information managed by a file system of an OS of the controller unit 100 to which the HDD 110 is connected, and the FS management information is recorded and stored in the magnetic disk 210.

An SMR method is used for recording information on a recording surface of the magnetic disk 210 in the HDD 110 according to this embodiment.

First, the data recording method of the SMR method is described briefly.

Figure 13A:
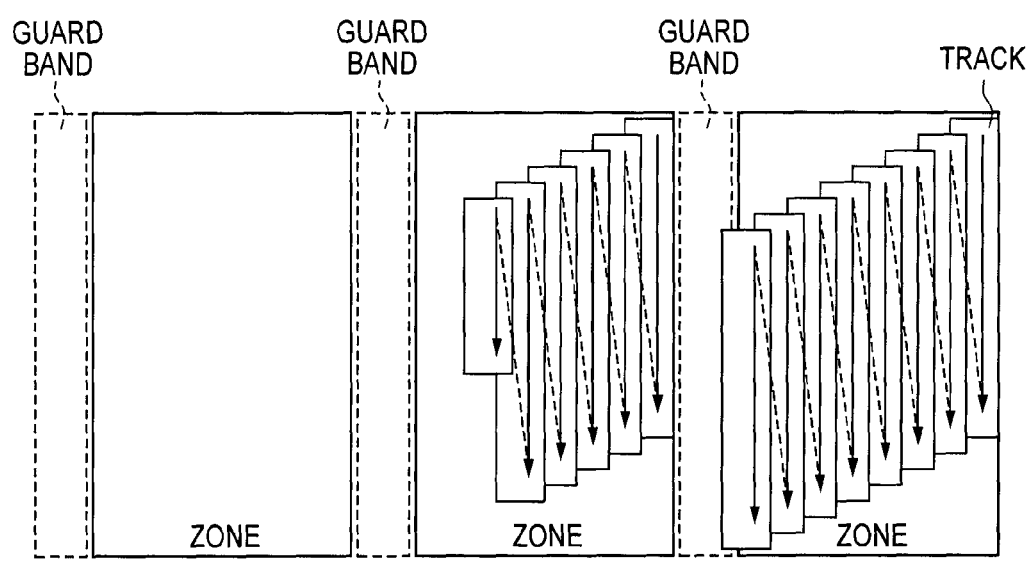
FIG. 13A depicts a view for describing data writing in a form of an SMR method.

FIG. 13A depicts a view for describing data writing by the SMR method.

As shown in FIG. 13A, in the SMR method, tracks are recorded sequentially, overlapping a portion of an adjacent track in units of a zone. Therefore, even in a case where a track in the middle of a zone is overwritten, overwriting only the middle track cannot be performed, and an overwriting is possible only in units of a zone. A guard band is arranged between zones for prevention of interference between tracks between adjacent zones.

Unlike a conventional PMR method, the relationship between a physical address and a logical address is not one-to-one, but rather dynamically changes depending on a usage condition of the magnetic disk 210 according to the SMR method. Therefore, link information between the physical address and the logical address is recorded and stored in the HDD management information managed by the controller 201.

Next, a method of normal deleting and updating of data in the SMR method is described.

Figure 13B:
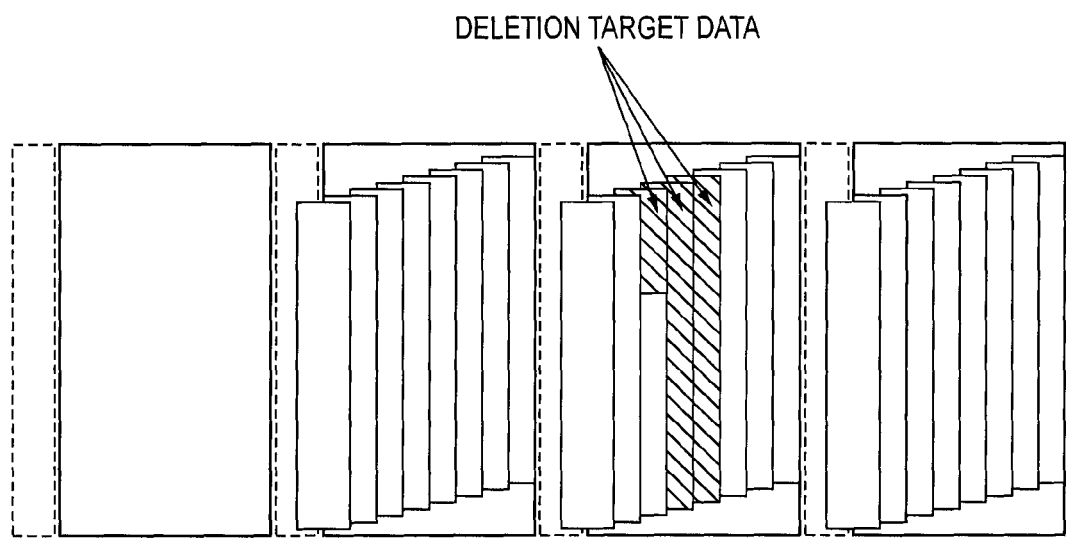
FIG. 13B depicts a view for describing deletion target data in a zone.

FIG. 13B depicts a view for describing deletion target data in a zone.

In a case where the deletion target data in a zone such as FIG. 13B is deleted, information for an address at which the deletion target data is stored is registered in both HDD management information and FS management information as an address of an unused area.

Figure 14:
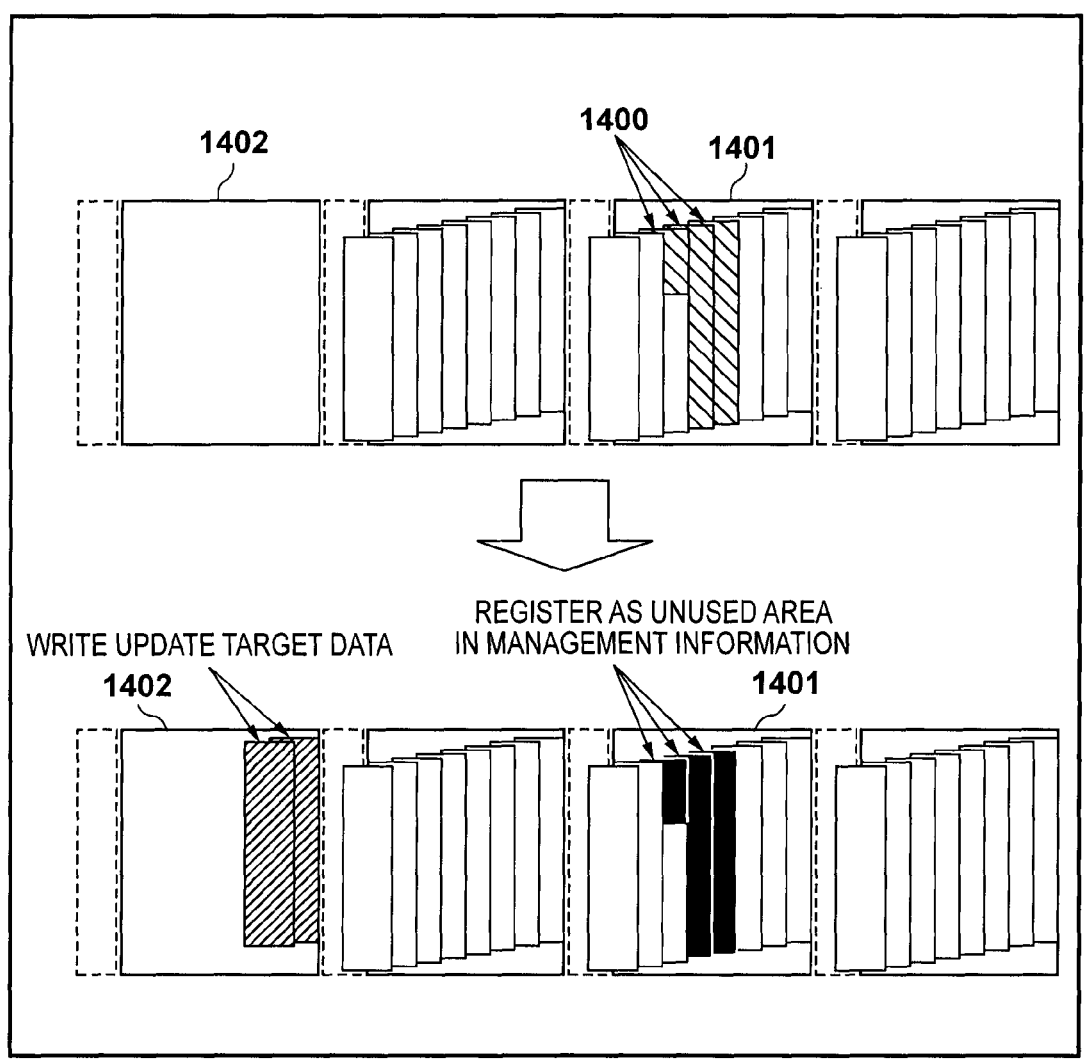
FIG. 14 depicts a view for describing data updating in a zone.

FIG. 14 depicts a view for describing data updating in a zone.

In a case where update target data 1400 of a zone 1401 is rewritten, the update target data 1400 is written in a vacant zone 1402 shown in FIG. 14. The information for an address at which the update target data 1400 is stored is registered for each of management information item as an unused area, similarly to when deleting the update target data 1400. Therefore, in cases of deletion and the updating of target data respectively, each management information item for the target data is updated only, and the deletion target data 1400 and the target data before the updating in the zone 1401 remain in the zone 1401 as are.

If a portion of data in a zone is deleted or updated repeatedly, zones including an unused area accumulate as shown in FIG. 13B and FIG. 14. A zone including such an unused area becomes an unwritable vacant area, because an overwriting to only a track in the unused area cannot be performed due to the characteristics of the SMR method. In order to eliminate unwritable zones including such an unused area, it is necessary to perform cleaning processing (defragmentation) as shown in FIGS. 15A-15C or FIGS. 16A-16D periodically.

Figure 15A:
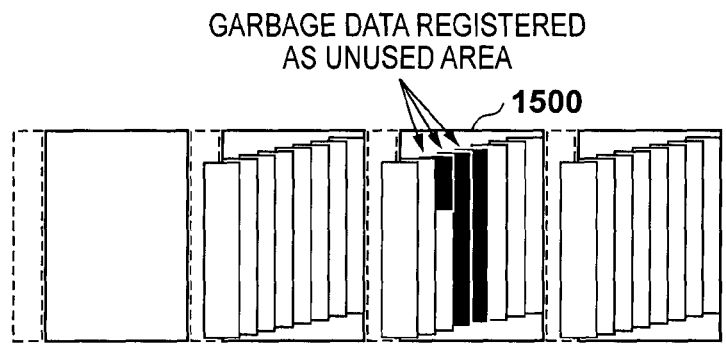
FIGS. 15A-15C depict views for describing cleaning processing.
Figure 15B:
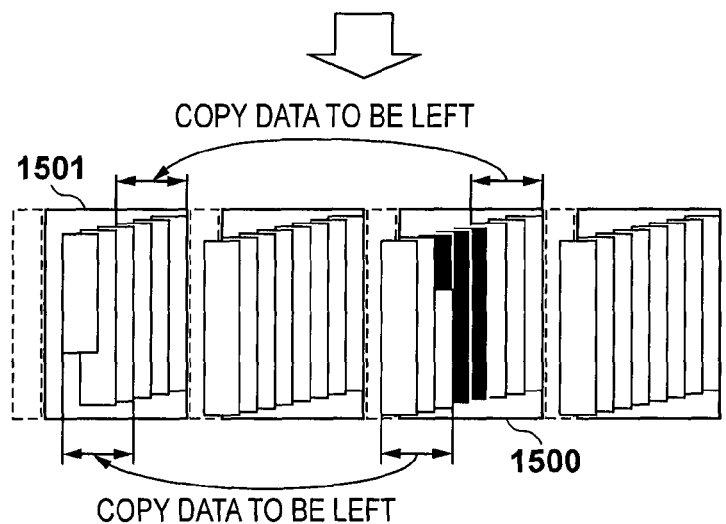
Figure 15C:
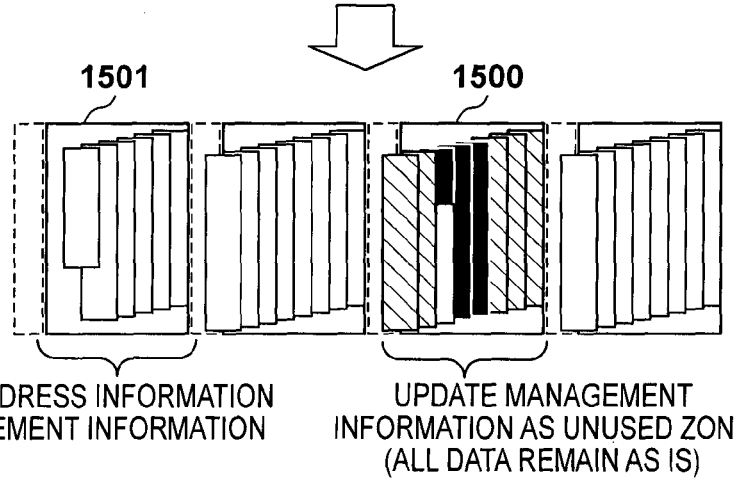

FIGS. 15A-15C depict views for describing cleaning processing.

For the zone 1500 including garbage data as shown in FIG. 15A, data in the zone 1500 that is desired to be left is copied to an unused zone 1501 as shown in FIG. 15B. After completion of the copy, as shown in FIG. 15C, the address information of the zone 1501 which is the new storage location for the data to leave is registered in the HDD management information, and the zone 1500 including the garbage data is registered in the HDD management information as the unused zone. Also in this case, all of data in the zone 1500 recognized as an unused zone remains as is until a writing of data to the zone 1500 is performed.

Also, FIGS. 16A-16D depict views for describing cleaning processing in a case where there is not a vacant zone.

Explanation will be given for a case in which for a zone 1600, which includes garbage data 1601, there is no other unused zone, as shown in FIG. 16A. In such a case, as in FIG. 16B, remaining data 1602 of the zone 1600 that is left is read out from data on a track written overlapping the garbage data 1601 out of the data of the zone 1600 desired to be left. Then the read out data 1602 is overwritten from a head of the garbage data 1601 of the same zone 1600. As in FIG. 16C, when the overwriting of the data 1602 which is desired to be left has completed, address information for the new storage location of the data 1602, which is desired to be left and is overwritten, is registered to the HDD management information. Then, as shown in FIG. 16D, a portion 1603 which has newly become garbage data is registered in the HDD management information as an unused area.

Next, detailed explanation will be given below for operation for data deletion in a complete delete mode for deleting data completely in the HDD 110 according to the first embodiment through the sixth embodiment. For ATA or SATA which is a general storage device interface, no command corresponding to a function such as data clear or deletion exists. Therefore, it is assumed that the complete delete processing according to the embodiments is performed in a form in which a write command (command for writing) is extended. Also, an operation performing cleaning processing at an appropriate timing in the HDD 110 according to the embodiments is described in detail in the sixth embodiment.

First Embodiment

FIGS. 5A-5D depict conceptual views for describing processing in a case where a complete delete of rewrite target data is performed upon rewriting of data in the HDD 110 according to the first embodiment.

Figure 3:
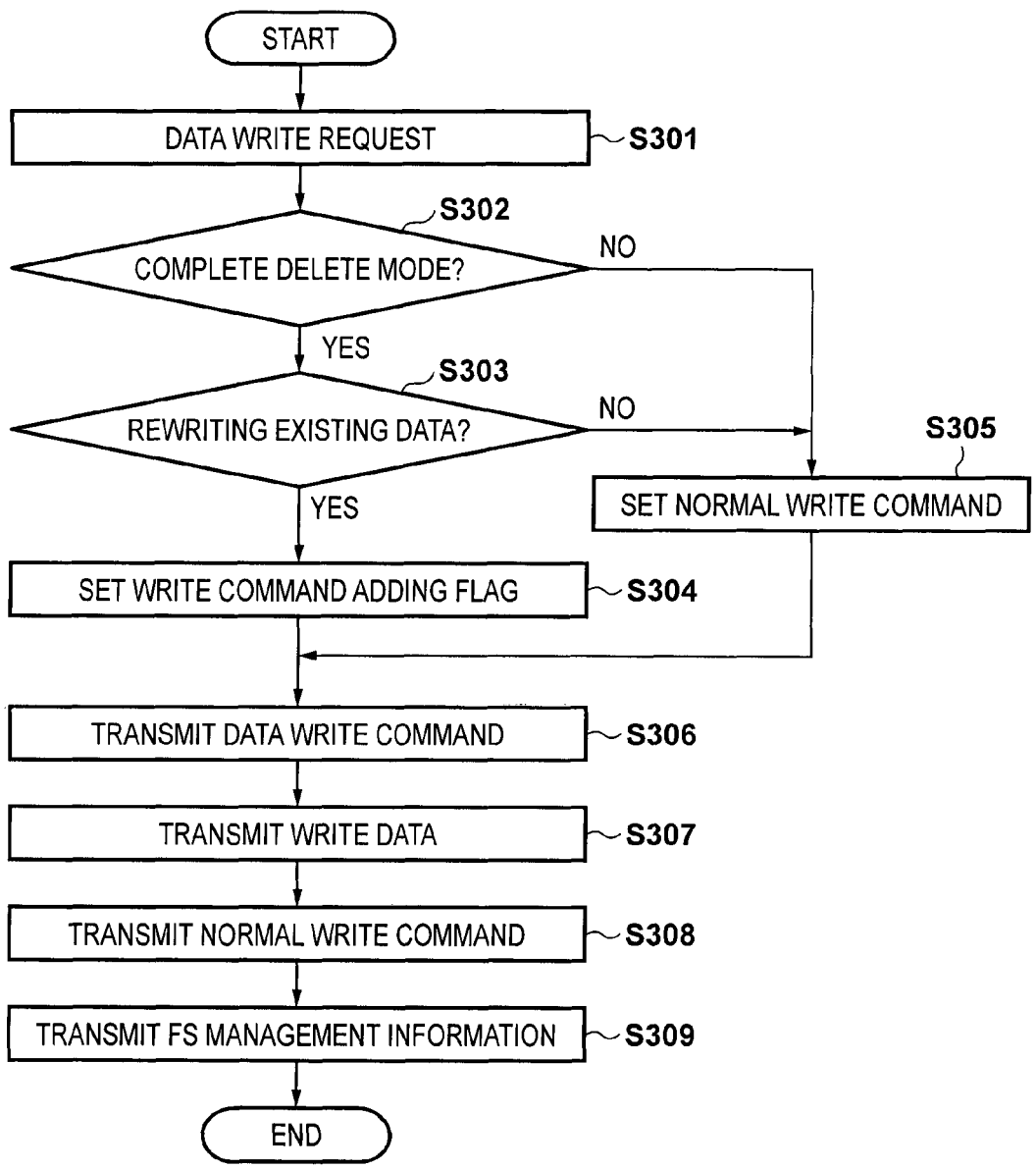
FIG. 3 is a flowchart for describing processing of the controller unit for executing processing according to a first embodiment.

FIG. 3 is a flowchart for describing processing of the controller unit 100 for executing processing according to the first embodiment. Note, processing illustrated in the flowchart of FIG. 3 is realized by executing a program deployed from the HDD 110 to the RAM 103 by the CPU 101.

Figure 5A:
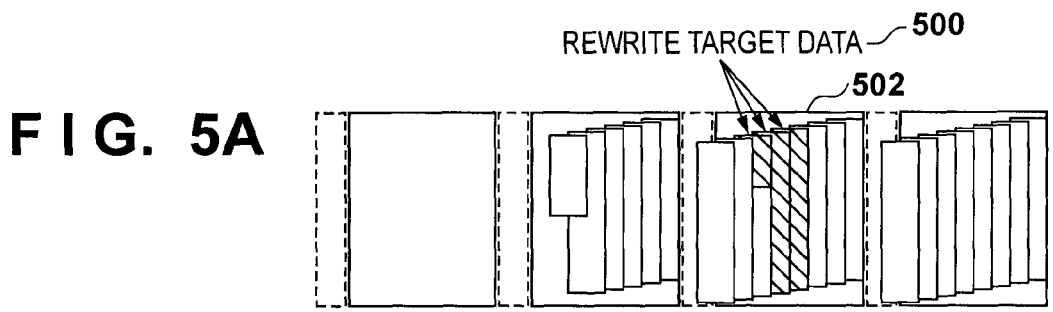
FIGS. 5A-5D depict conceptual views for describing processing in a case where a complete delete of rewrite target data is performed upon rewriting data in the HDD according to the first embodiment.

Here, as shown in FIG. 5A, first in step S301 of FIG. 3, a data rewrite request (write request) is issued for rewrite target data 500 in the HDD 110 by an OS. With this, the processing proceeds to step S302 and the CPU 101 determines whether or not the image forming apparatus is set in a complete delete mode of unnecessary data. Here, in a case where the complete delete mode is set, the processing proceeds to step S303, and the CPU 101 confirms a write destination area and determines whether requested writing is a new write or a rewrite of existing data. Note, in a case where the CPU 101 determines it is not in the complete delete mode in step S302 or determines it is not a rewrite of existing data in step S303, then the processing proceeds to step S305. In step S305, the CPU 101 sets a normal write command and the processing proceeds to step S306.

In a case where the CPU 101 determines that the requested writing is the rewrite of existing data in step S303, the processing proceeds to step S304, and the CPU 101 sets a predetermined value which is complete delete flag data in an area, which ignored by all other than a specific corresponding device, for the data write command (write command) transmitted to the HDD 110. Note, the area corresponds to a features register in a case of the SATA or ATA standard storage interface. Flag data set in the features register can include a selection of write command (rewrite/delete) described later, selection of overwrite data, setting of the number of overwrites, or the like, in addition to the enablement/disablement of the complete delete mode. In the first embodiment, at least the complete delete mode is enabled, and the flag data is set as to rewrite for the write command selection.

Then the processing proceeds to step S306, and the CPU 101 transmits a data write command set in step S304 or step S305 to the HDD 110 via the storage controller 112. Then the processing proceeds to step S307, and the CPU 101 transmits data to be actually written to the HDD 110 via the storage controller 112. Next, the processing proceeds to step S308, the CPU 101 transmits a normal write command to the HDD 110 in order to update the file system. Next, the processing proceeds to step S309, and the CPU 101 transmits FS management information update data such as rewrite target data logical address information to the HDD 110, and the processing completes.

Figure 4:
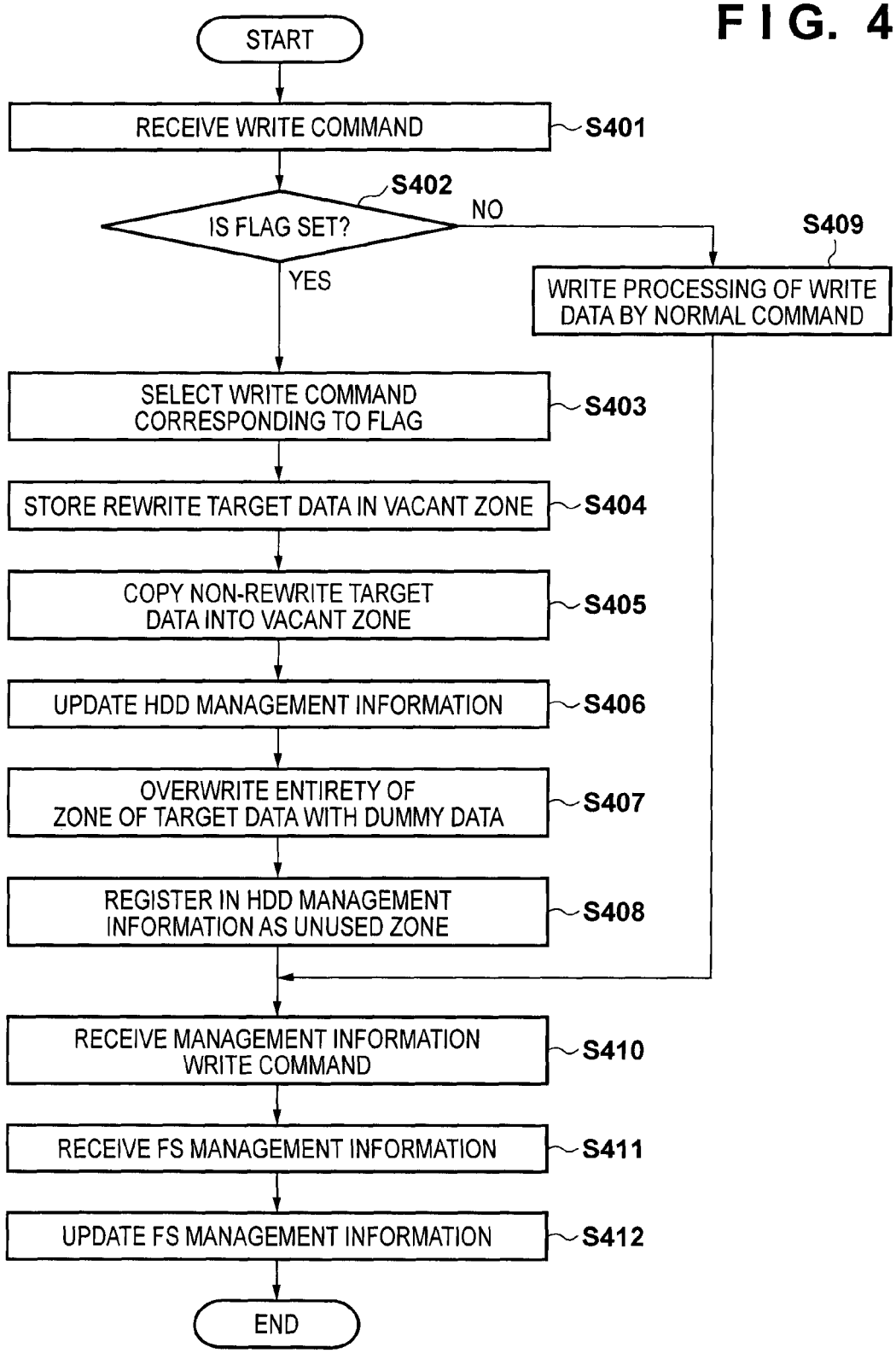
FIG. 4 is a flowchart for describing processing of a controller of the HDD according to the first embodiment.

FIG. 4 is a flowchart for describing processing of the controller 201 of the HDD 110 according to the first embodiment.

First, the controller 201 receives the data write command transmitted from the controller unit 100 in step S306 of FIG. 3 by the host I/F 202 of the HDD 110 in step S401. Then the processing proceeds to step S402, and the controller 201 determines whether or not the flag data of the complete delete mode is set in the write command. In a case where the flag data is set, the processing proceeds to step S403, and the controller 201 selects a write command corresponding to the flag data. Here, a rewrite mode write command corresponding to the complete delete mode is selected. On the other hand, in a case where the flag data is not detected in step S402, the processing proceeds to step S409, data writing is performed by normal write processing, and the processing proceeds to step S410.

Figure 5B:
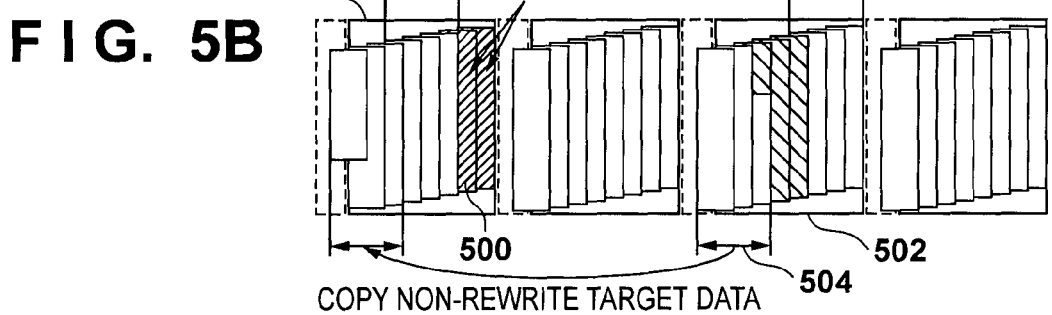

In step S404, as shown in FIG. 5B, the controller 201 writes rewrite target data 500 received from the storage controller 112 of the controller unit 100 in a vacant zone 503 in the magnetic disk 210 in the HDD 110. The vacant zone 503 may be a new unused zone or a used zone to which it is possible to add. In FIG. 5B, an example in a case where a new unused zone is used as the vacant zone 503 is shown.

Next, the processing proceeds to step S405, the controller 201 copies non-rewrite target data 504 in the zone 502, which includes the rewrite target data 500 in the magnetic disk 210, into the vacant zone 503 in the magnetic disk 210 as shown in FIG. 5B. The vacant zone may be a new unused zone or a used zone to which it is possible to add. Next, the processing proceeds to step S406, and the controller 201 performs an update of the storage location address of the rewrite target data 505, and performs an update of the storage location address information of the copied non-rewrite target data 504 to the HDD management information.

Figure 5C:
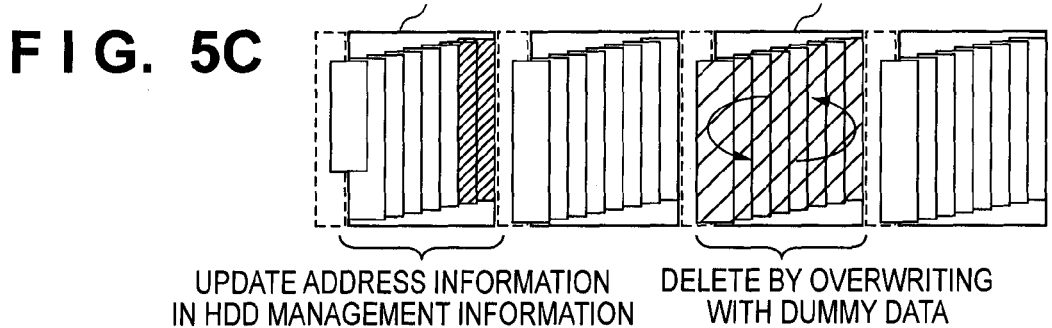
Figure 5D:
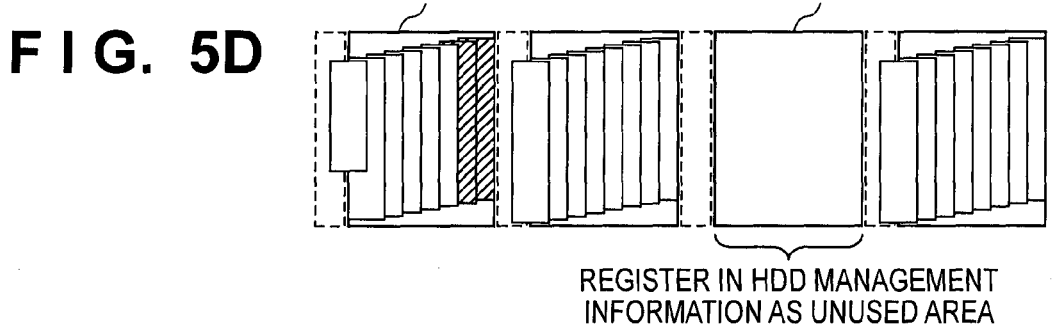

Next, the processing proceeds to step S407, the controller 201 performs overwrite processing for the entire area of the zone 502 in which the rewrite target data 500 is included as shown in FIG. 5C. In the overwrite processing, execution is performed in accordance with the flag data set in step S304 in FIG. 3, which includes such information as the write data for performing the overwrite and the number of times of the overwrite, or the like. Next, the processing proceeds to step S408, and the controller 201 registers the zone 502 on which the overwrite processing has been performed in the HDD management information as an unused zone as shown in FIG. 5D. Then, in a case where the controller 201, in step S410, receives the normal write command transmitted from the controller unit 100, the processing proceeds to step S411, and the controller 201 receives FS management information including logical address information of the rewrite target data 500. And the processing proceeds to step S412 and the controller 201 updates the FS management information of the magnetic disk 210 using the received FS management information.

With the above processing, when the rewrite target data 500 is rewritten, data in the zone 502 in which the rewrite target data 500 is stored is deleted completely, and the zone 502 is registered as an unused zone. With this, the rewritten data does not remain in the zone as is, and an unused zone can be allocated.

Second Embodiment

Next, a second embodiment of the invention is described. In the second embodiment, as shown in FIGS. 7A-7D, in a case where rewrite target data 702 in a zone 700 is rewritten, data other than the rewrite target data 702 in the zone 700 is copied into another vacant zone 701, and the rewrite target data 702 is written in the zone 701. Then, by overwriting a track in which the rewrite target data 702 is stored in the zone 700 with dummy data, the zone 700 is registered as an unused area. Note, the configurations of the controller unit 100 and the HDD 110 according to the second embodiment are the same as those in the previously described first embodiment, so explanation of these will be omitted.

FIG. 6 is a flowchart for describing processing of the controller 201 in the HDD 110 according to the second embodiment of the invention, and steps in common with FIG. 4 described previously are shown with the same reference numerals, and explanation of these will be omitted.

FIGS. 7A-7D depict conceptual views for describing processing in a case where a complete delete of rewrite target data is performed upon rewriting data in an HDD according to the second embodiment.

Figure 7A:
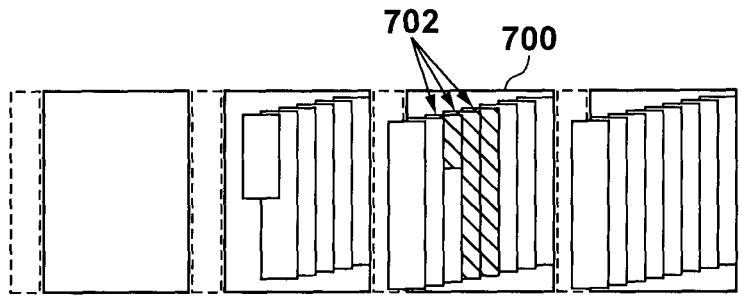
FIGS. 7A-7D depict conceptual views for describing processing in a case where a complete delete of rewrite target data is performed upon rewriting data in the HDD according to the second embodiment.
Figure 7B:
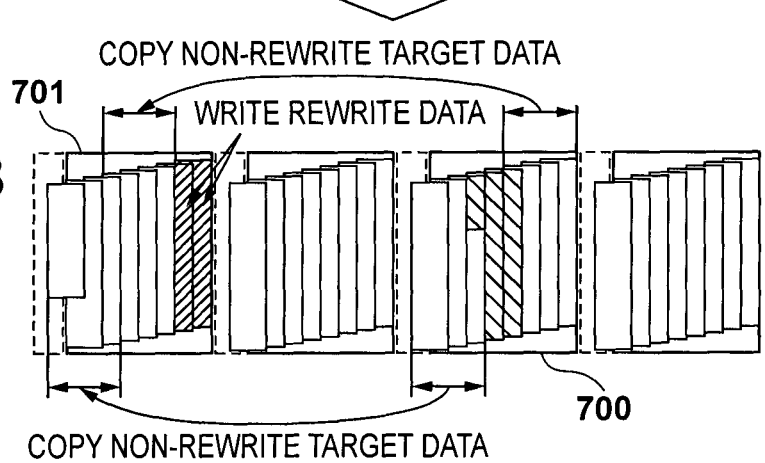
Figure 7C:
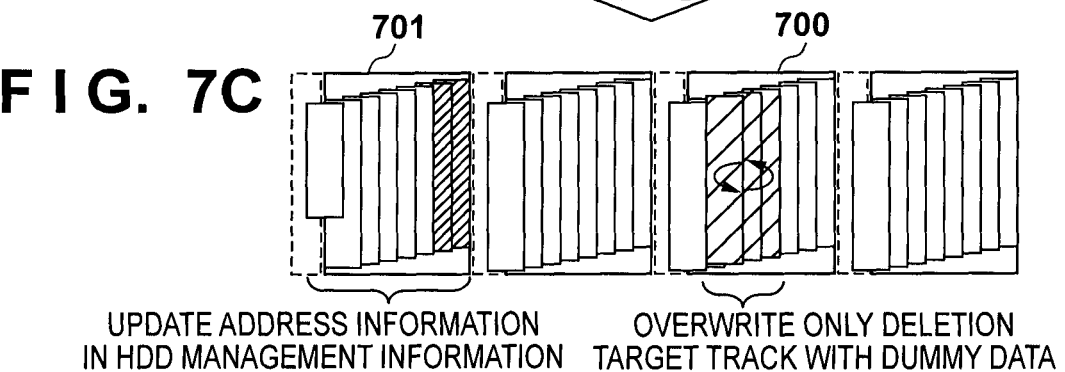
Figure 7D:
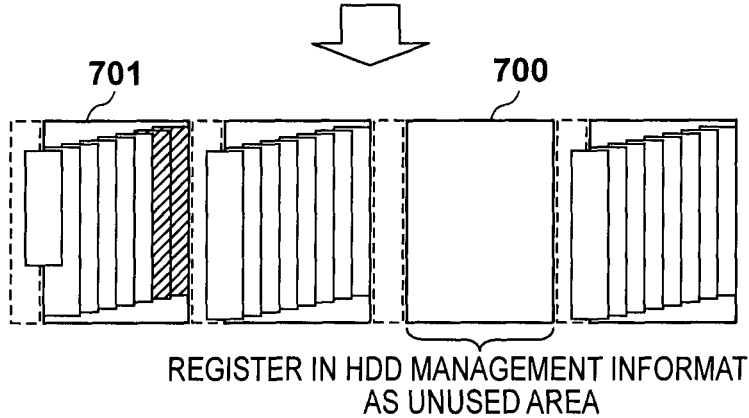

In step S601 in FIG. 6, the controller 201 performs overwrite processing to only the track of the zone 700 in which the rewrite target data 702 is stored as shown in FIG. 7C. By this overwrite processing, write data and the number of overwriting, or the like, for performing overwriting can be arbitrarily set.

According to the second embodiment, compared with the processing in the first embodiment, faster processing can be realized in a case where complete delete target data is data of a portion of the zone because a range over which data is overwritten in the zone can be small.

Third Embodiment

Next, a third embodiment of the invention is described. In the third embodiment, in a case where a data deletion in a particular zone is instructed, non-deletion target data in the zone is copied to another zone. Then, the entire zone is overwritten with dummy data, and the entire zone is registered as an unused area. Note, the configurations of the controller unit 100 and the HDD 110 according to the third embodiment are the same as those in the previously described first embodiment, so explanation of these will be omitted.

Figure 8:
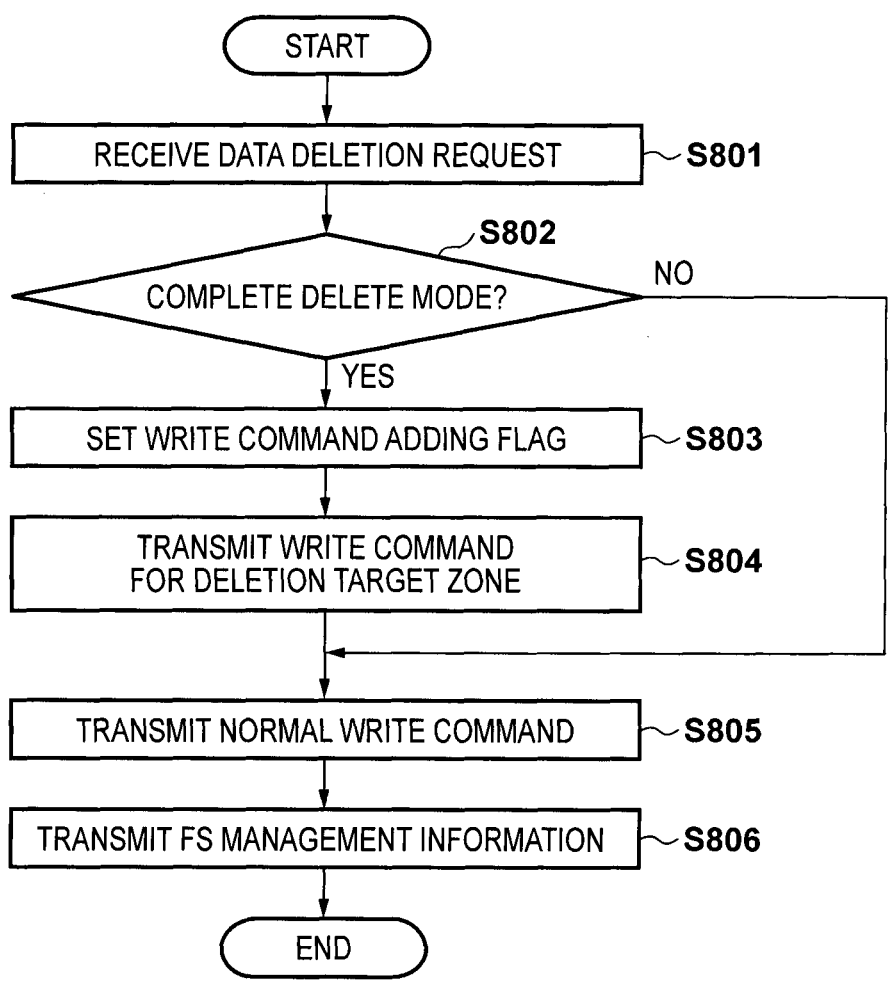
FIG. 8 is a flowchart for describing processing of the controller unit according to a third embodiment of the invention.

FIG. 8 is a flowchart for describing processing of the controller unit 100 according to the third embodiment of the invention. Note that the processing illustrated by the flowchart of FIG. 8 is realized by the CPU 101 executing a program loaded into the RAM 103 from the HDD 110.

FIGS. 10A-10D depict conceptual views for describing processing in a case where data in the HDD 110 is deleted according to the third embodiment.

In a case where the CPU 101 receives a request to delete deletion target data in the HDD 110 from an OS in step S801 of FIG. 8, the processing proceeds to step S802 and the CPU 101 determines whether or not the image forming apparatus is set in the unnecessary data complete delete mode. In a case where it is determined in step S802 that the complete delete mode is not set, the processing proceeds to step S805, but in a case where it is determined in step S802 that the complete delete mode is set, the processing proceeds to step S803. In step S803, the CPU 101 sets a predetermined value which is complete delete flag data for an area, which is ignored by devices other than a specific corresponding device, of a data write command transmitted to the HDD 110. In the third embodiment, at least the complete delete mode is enabled, and the flag data is set as to a deletion mode for the write command selection. Next, the processing proceeds to step S804 and the CPU 101 transmits the write command set in step S803 to the HDD 110, and the processing proceeds to step S805. In step S805, the CPU 101 transmits a normal write command in order to update the file system of the HDD 110. Next, the processing proceeds to step S806, the CPU 101 transmits FS management information update data such as logical address information of the deletion target data to the HDD 110, and the processing completes.

FIG. 9 is a flowchart for describing processing of the controller 201 of the HDD 110 according to the third embodiment. Note that in FIG. 9, steps in common with the previously described FIG. 4 are shown with the same reference numerals, and explanation of these will be omitted.

In step S901, the controller 201 receives the data write command transmitted from the controller unit 100 in step S804 in FIG. 8. Next, the processing proceeds to step S902, and the controller 201 determines whether or not there is flag data for a complete delete in the write command. When there is no flag data for the complete delete, transition is made to step S907 because it is a normal write command. In this case, a write target of the normal write command is the FS management information. On the other hand, in a case where the controller 201 determines there is the flag data for the complete delete in step S902, the processing proceeds to step S903. In step S903, the controller 201 selects a write command corresponding to the flag data. Here, a deletion mode write command corresponding to the complete delete is selected.

Figure 10A:
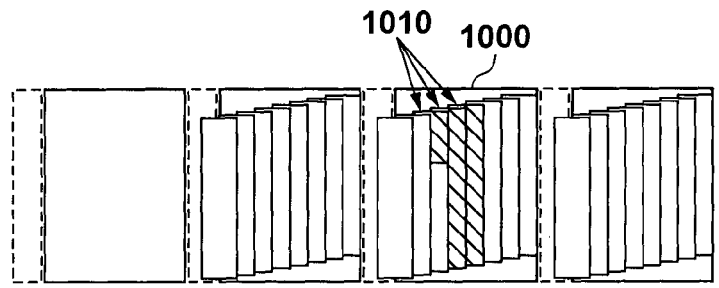
FIGS. 10A-10D depict conceptual views for describing processing in a case where data in the HDD is deleted according to the third embodiment.
Figure 10B:
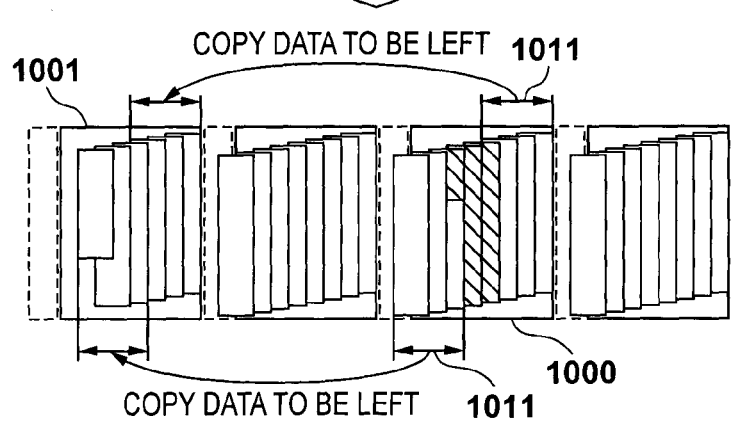
Figure 10C:
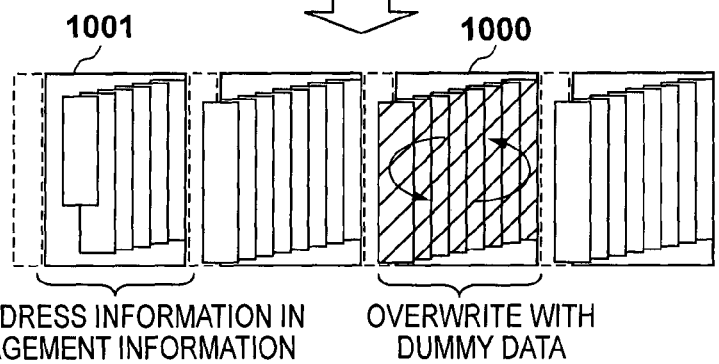
Figure 10D:

When the write command is executed, the controller 201, in step S904, does not perform data writing, but copies non-deletion target data in the zone into a vacant zone. Here, as shown in FIG. 10B, non-deletion target data 1011 in a zone 1000 which includes the deletion target data 1010 of the magnetic disk 210 is copied to a vacant zone 1001 in the magnetic disk 210. Note that the vacant zone may be a new unused zone or a used zone to which it is possible to add. Next, the processing proceeds to step S905, the controller 201 updates storage location address information of the copied non-deletion target data 1011 in the HDD management information. Then the processing proceeds to step S407, the controller 201 deletes by overwriting the zone 1000 with dummy data (FIG. 10C), and next the zone 1000 is registered as an unused area in step S408 (FIG. 10D).

In step S906, the controller 201 receives a zone deletion target write command transmitted from the controller unit 100 in step S804. Then, in step S907, the controller 201 receives the FS management information including the logical address information of the deletion target data 1010 transmitted from the controller unit 100 in step S805. Then the processing proceeds to step S908, the controller 201 updates the FS management information of the magnetic disk 210 using the received FS management information.

With the processing above, data in a zone including deletion target data can be deleted completely along with the deletion target data.

Fourth Embodiment

Figure 12A:
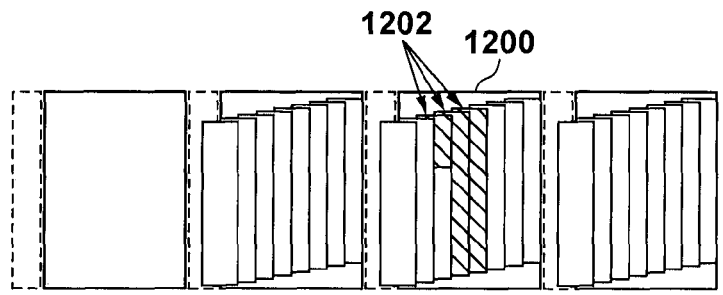
FIGS. 12A-12D depict conceptual views for describing data deletion upon corresponding to a complete delete according to the fourth embodiment.
Figure 12B:
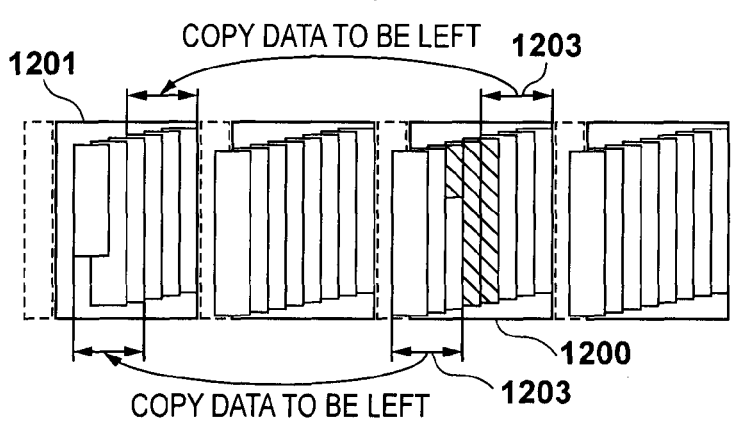
Figure 12C:
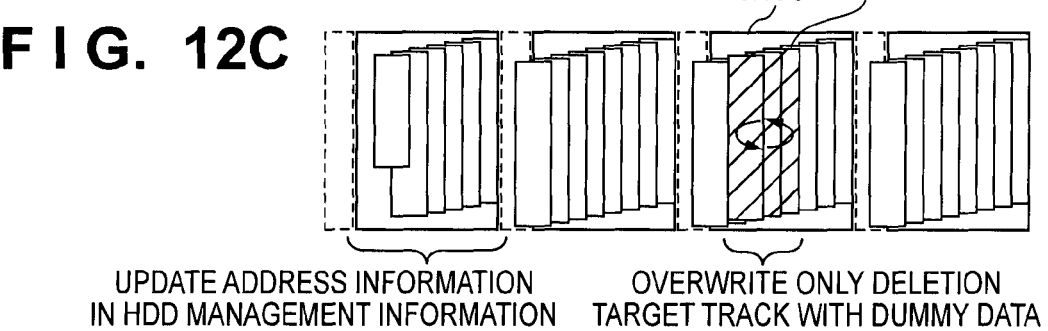
Figure 12D:
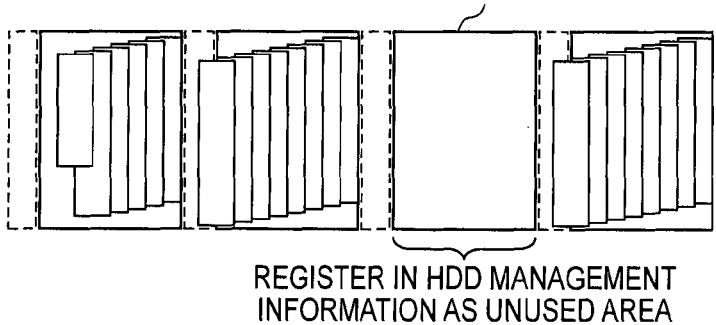

Next, explanation will be given for a fourth embodiment of the invention. In the fourth embodiment, in FIGS. 12A-12D, in a case where data 1202 in a zone 1200 is deleted, data 1203 other than deletion target data 1202 in the zone 1200 is copied into another vacant zone 1201 (FIG. 12B). Then, by overwriting a track 1204 in which the deletion target data 1202 is stored in the zone 1200 with dummy data, the deletion target data 1202 is deleted (FIG. 12C). Then, the zone 1200 is registered as an unused area (FIG. 12D). Note, the configurations of the controller unit 100 and the HDD 110 according to the fourth embodiment are the same as those in the previously described first embodiment, so explanation of these will be omitted.

Figure 11:
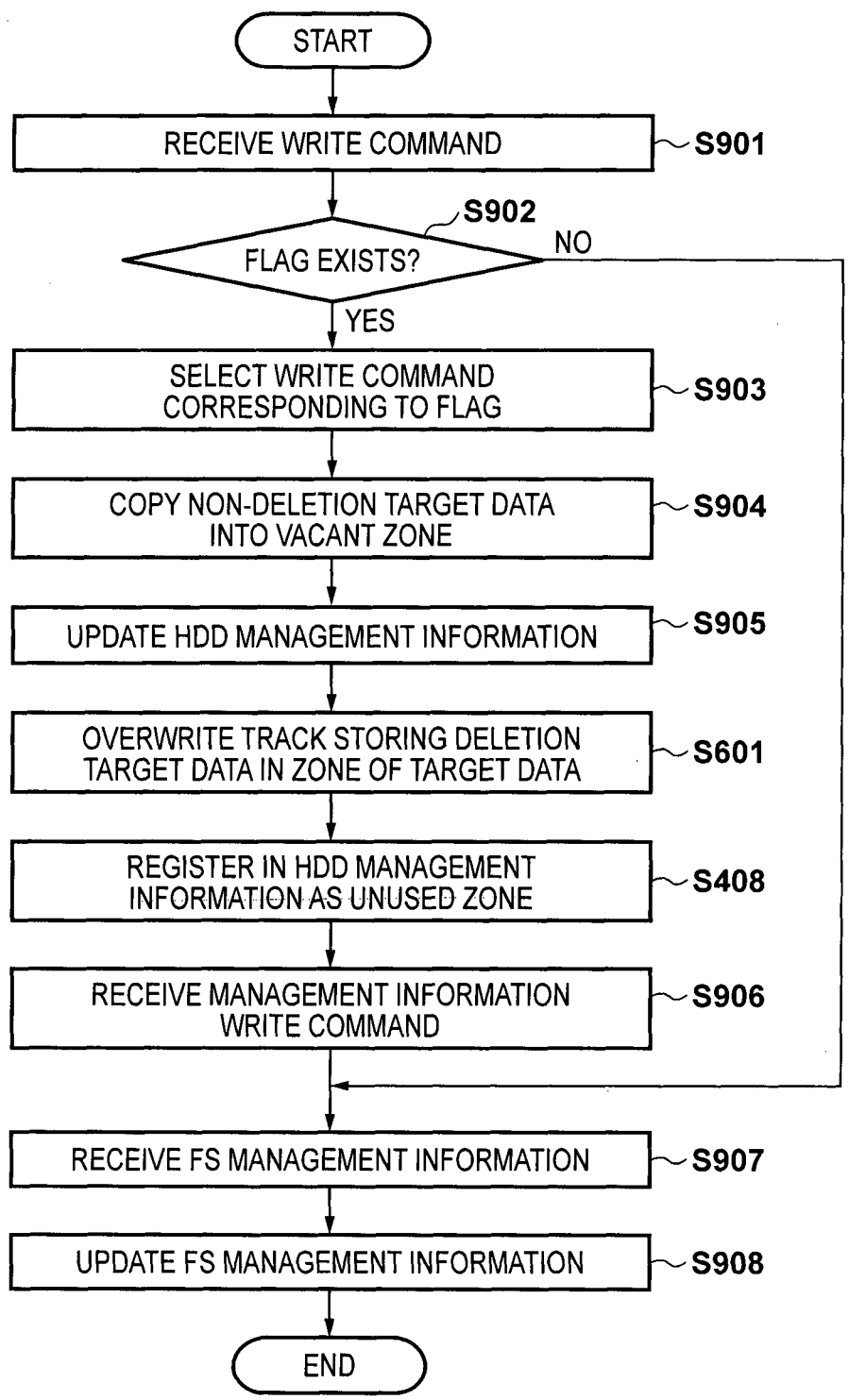
FIG. 11 is a flowchart for describing processing of the controller according to a fourth embodiment of the invention.

FIG. 11 is a flowchart for describing processing of the controller 201 according to the fourth embodiment of the present invention, and steps common to previously described FIG. 4, FIG. 6, and FIG. 9 are indicated with the same reference numerals and explanation of these will be omitted.

FIGS. 12A-12D depict conceptual views for describing processing in a case where a complete delete of deletion target data is performed upon data deletion in the HDD 110 in the fourth embodiment.

According to the fourth embodiment, in a case where complete delete target data is stored in a portion of the zone, faster deletion processing can be realized compared with the processing in the third embodiment because the range in which data is overwritten in the zone can be small since deletion is performed in units of tracks in the zone.

Fifth Embodiment

Next, explanation will be given for a fifth embodiment of the invention. Note, the configurations of the controller unit 100 and the HDD 110 according to the fifth embodiment are the same as those in the previously described first embodiment, so explanation of these will be omitted.

FIGS. 18A-18D and FIGS. 19A-19D depict conceptual views for describing processing performing a complete delete of deletion target data upon data deletion in the fifth embodiment. A difference with the previously described third and fourth embodiments is that deletion target data is overwritten with non-deletion target data in the same zone.

Figure 18A:
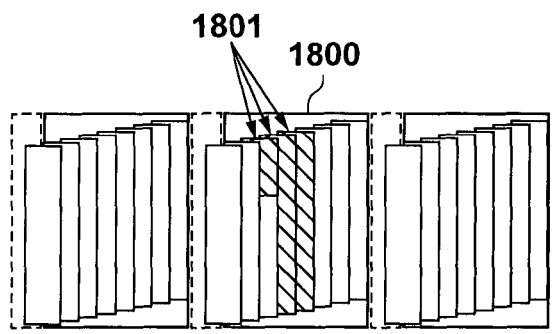
FIGS. 18A-18D depict conceptual views for describing processing for performing a complete delete of deletion target data upon data deletion according to the fifth embodiment.
Figure 18B:
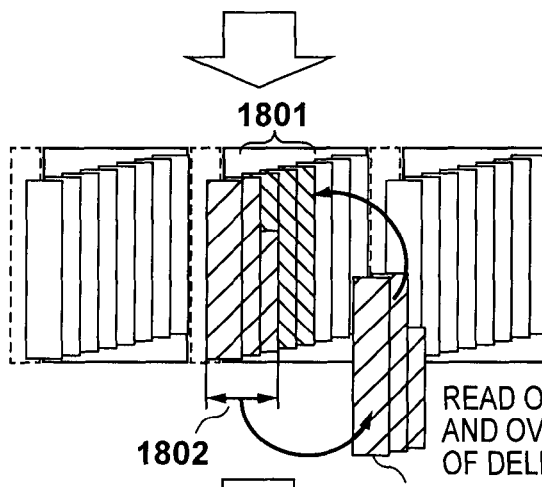
Figure 18C:
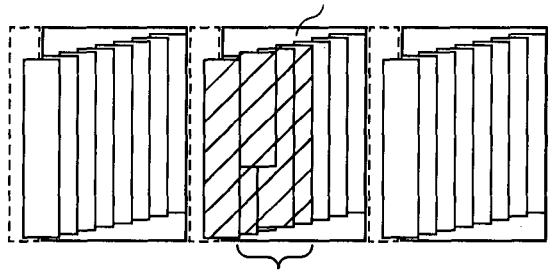
Figure 18D:
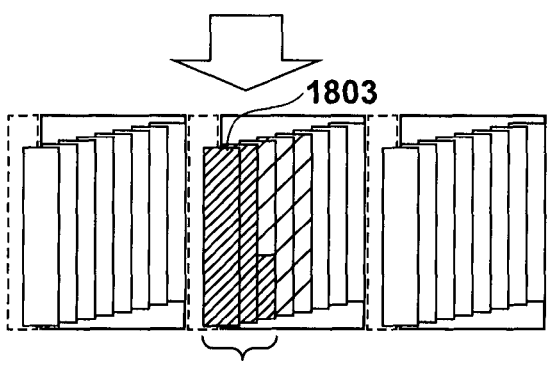

In a case where a deletion of data 1801 in a zone 1800 is instructed in FIG. 18A, as shown in FIG. 18B, within the non-deletion target data, all of data 1802 of a track written overlapping the deletion target data 1801 is read out. Then, an overwriting is performed with the data 1802 from a head address at which the deletion target data 1801 is stored. With this, as shown in FIG. 18C, the deletion target data 1801 is overwritten by the data 1802 and deleted. Then the HDD management information of the data 1801 and 1802 is updated. Furthermore, as shown in FIG. 18D, an unnecessary data area 1803 beyond the data that is overwritten in the zone 1800, which is generated by overwriting from the head of data 1801 with the data 1802, is registered as an unused area.

With this, because the effort of overwriting the deletion target data with dummy data as in the previously described third and the fourth embodiments can be omitted, and a vacant area which can be overwritten in the same zone can be allocated, the next write processing can be executed immediately. Also in a case where there is no other vacant zone, the effect of being able to complete the processing within the same zone is obtained.

Figure 19A:
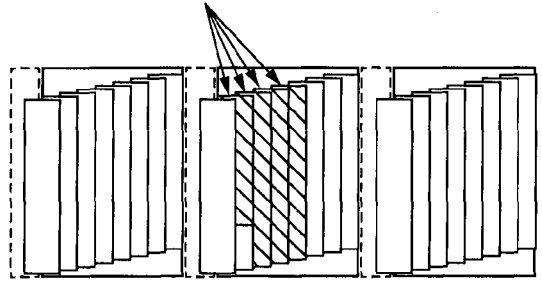
FIGS. 19A-19D depict conceptual views for describing processing for performing a complete delete of deletion target data upon data deletion according to the fifth embodiment.
Figure 19B:
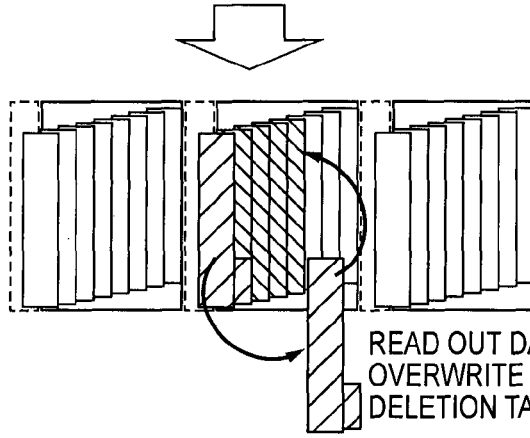
Figure 19C:
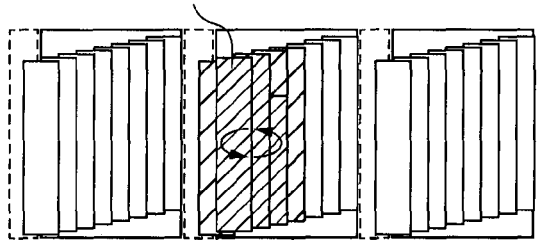
Figure 19D:
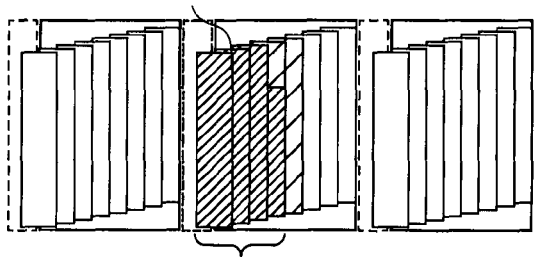

Also in an example of FIGS. 19A-19D, similarly to FIGS. 18A and 18B, the deletion target data is overwritten with non-deletion target data. However, cases where not all of the deletion target data can be overwritten with non-deletion target data occur due to the data amount of deletion target data being more than the data amount of non-deletion target data. In such a case, as shown in FIG. 19C, data in a track 1901, which could not be overwritten, is overwritten with dummy data. And as shown in FIG. 19D, the track 1901 is registered as an unused area. With this, a complete delete of the deletion target data in the same zone can be realized.

Figure 20A:
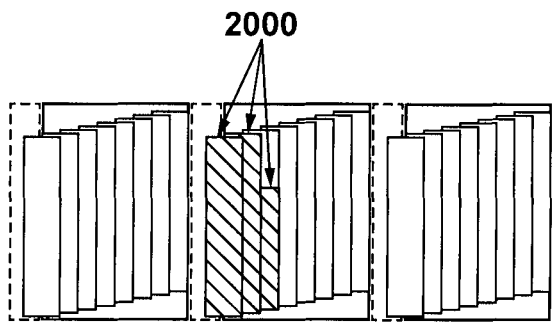
FIGS. 20A-20C depict conceptual views for describing processing for performing a complete delete of deletion target data upon data deletion according to the fifth embodiment.
Figure 20B:
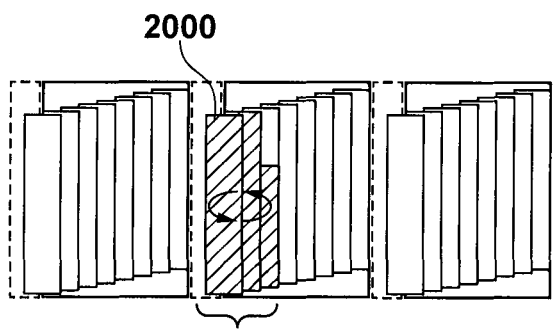
Figure 20C:
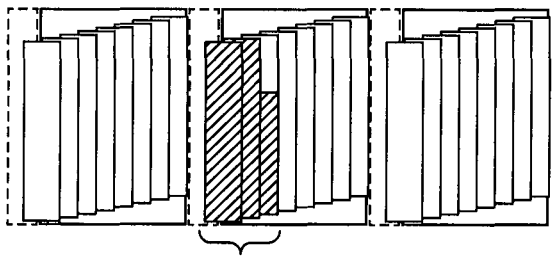

Also, in an example in FIGS. 20A-20C, in a case where there is deletion target data 2000 as in FIG. 20A, there is no track written overlapping the deletion target data 2000. In such a case, as shown in FIG. 20B, the deletion target data 2000 is overwritten by dummy data. Then, as shown by FIG. 20C, a complete delete of the deletion target data 2000 can be realized by updating the HDD management information such that the area in which the deletion target data is stored is set as an unused area.

Explanation will be given for the above described processing with reference to the flowchart of FIG. 17.

FIG. 17 is a flowchart for describing processing of the controller 201 according to the fifth embodiment of the invention, and portions in common with FIG. 9 described previously are shown with the same reference numerals, and explanation of these will be omitted.

In step S903, after the controller 201 selects a write command corresponding to the flag data, the processing proceeds to step S1701, and the controller 201 detects a position of a track to which the deletion target data is written in the zone. Then, in step S1702, the controller 201 confirms whether or not there is non-deletion target data in the track group written overlappingly in order on tracks on which the deletion target data detected in step S1701 is written, and the controller 201 determines whether or not the deletion target data is able to be overwritten with the dummy data. When it is determined that the deletion target data is able to be overwritten with the dummy data, i.e. it is determined that there is no non-deletion target data in the tracks to which the deletion target data is written, the processing proceeds to step S1707, and the controller 201, as illustrated in FIG. 20B, overwrites the deletion target data with the dummy data, and the processing proceeds to step S905.

Meanwhile, in step S1702, when it is determined that there is non-deletion target data in the track to which the deletion target data is written, the processing proceeds to step S1703. In step S1703, the controller 201 reads out the non-deletion target data written in the track group written overlappingly in order with a track on which the deletion target data is written (FIG. 18B, FIG. 19B). Next, the processing proceeds to step S1704, and the controller 201, from the head address of the track on which the deletion target data is written, overwrites the deletion target data with the non-deletion target data read out from the same zone (FIG. 18B, FIG. 19B).

Next, the processing proceeds to step S1705, and the controller 201 determines whether or not it was possible to overwrite the deletion target data completely by the non-deletion target data. This processing may be performed by comparing the data amounts of both in advance, or may be determined by comparing a last address of the deletion target data and an address at which the writing of the non-deletion target data finished. In a case where it is determined that it was not possible to overwrite completely in step S1705, the processing proceeds to step S1706, the remaining deletion target data is overwritten with the dummy data (FIG. 19C), and the processing proceeds to step S905. Also, in a case where it is determined that it was possible to overwrite completely in step S1705, the processing proceeds to step S905, and the HDD management information is updated. In the processing of step S905, address information of the non-deletion target data and an area that newly became unused is updated.

As explained above, according to the fifth embodiment, it is possible to realize faster processing than the processing in the previously described third and fourth embodiments because copying of non-deletion target data and deletion of deletion target data by overwriting with the non-deletion target data or the dummy data can be performed at one time. At the same time, because it is possible to make an end of a zone into an unused area, the subsequent write processing can be executed immediately without worrying about the overwriting of data. Also, because the processing can be completed within the same zone, the complete deletion of data can be executed without using a vacant zone.

Sixth Embodiment

Next, a sixth embodiment of the invention is described. Note, the configurations of the controller unit 100 and the HDD 110 according to the sixth embodiment are the same as those in the previously described first embodiment, so explanation of these will be omitted. In the sixth embodiment, explanation will be given for operation in which the HDD 110 performs the cleaning processing explained with reference to FIGS. 15A-15C and FIGS. 16A-16D at an appropriate timing.

Figure 21:
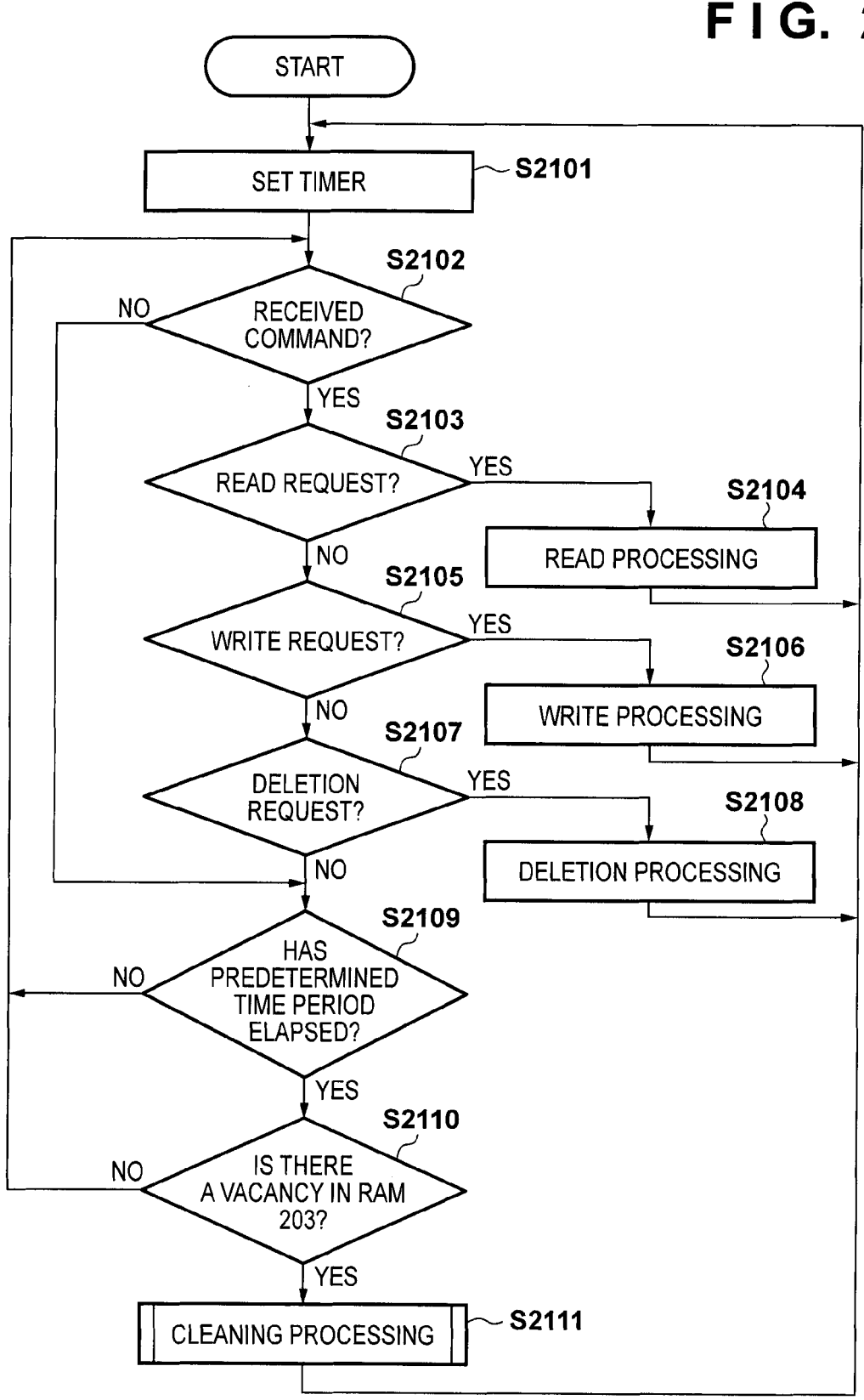
FIG. 21 is a flowchart for describing processing of the controller according to a sixth embodiment of the invention.

FIG. 21 is a flowchart for describing processing of the controller 201 according to the sixth embodiment of the present invention.

Firstly, in step S2101, the controller 201 causes counting of time to be initiated by setting a predetermined period of time for a timer (not shown) within the HDD 110. Details of this predetermined period of time will be explained later. Next, the processing proceeds to step S2102, and the controller 201 determines whether or not a command is received from the controller unit 100, and in a case where a command is received, the processing proceeds to step S2103, and it is determined whether or not the command is a read request. Note that the type of the command is not limited to the content in this embodiment, and there is no limitation to the type of command, if it is applicable to the ATA or SATA standard, as is the complete delete indicated in the previously described the first through the fifth embodiments, for example. If it is determined that it is the read request in step S2103, the processing proceeds to step S2104, the controller 201 executes read processing for reading out data from the magnetic disk 210, and the processing proceeds to step S2101. More specifically, data recorded in the magnetic disk 210 corresponding to a logical address included in data described in the read command is read out, and is transmitted to the destination that issued the read request.

If it is not the read request in step S2103, the processing proceeds to step S2105, and the controller 201 determines whether or not the command is a write request. If it is the write request, the processing proceeds to step S2106, and the controller 201 executes write processing for writing data to the magnetic disk 210, and the processing proceeds to step S2101. More specifically, subsequent write data is recorded to the magnetic disk 210 corresponding to the logical address included in the data in which the write command is described. Also, in a case where in the write command there is a data rewrite, the write data is recorded, and also the logical addresses in the HDD management information and the FS management information corresponding to the magnetic disk 210 at which the rewritten data is recorded are updated to be unused areas.

If it is not the write request in step S2105, the processing proceeds to step S2107, and the controller 201 determines whether or not the command is a request to delete data. If it is the request to delete, the processing proceeds to step S2108, and the controller 201 executes deletion processing for deleting the instructed data of the magnetic disk 210, and the processing proceeds to step S2101. More specifically, as in FIG. 13B, the area of data recorded at the logical address included in the data described in the deletion command is updated to be an unused area. For this, the HDD management information and the FS management information, in which logical addresses are managed, is updated.

When, in step S2107, it is not the deletion request, the processing proceeds to step S2109, and the controller 201 determines whether or not the predetermined amount of time set in step S2101 has been counted by the timer, and if not, the processing proceeds to step S2102; however, if the predetermined period of time has elapsed, the processing proceeds to step S2110. The predetermined period of time is something that determines the timing for performing the subsequent cleaning processing executed in step S2111 which is explained by FIGS. 15A-15C and FIGS. 16A-16D. The time period required for the cleaning processing is dependent upon the number and location of unused areas, and the amount of data to be left, but compared to processing for read/write/deletion commands, the cleaning processing requires a long time. For this reason, it is determined that the situation is not such that these commands are consecutive by waiting for a predetermined period of time to elapse after the processing for these commands complete, and the cleaning processing is caused to execute in this unoccupied time. By doing this, it is possible to prevent a deterioration of performance of processing for accessing the HDD 110 of the system. When it is determined that the predetermined period of time has not elapsed in step S2109, the processing returns to the processing for determining whether or not a command is received in step S2102.

Meanwhile, when it is determined that the predetermined period of time has elapsed in step S2109, the processing proceeds to step S2110, and the controller 201 determines whether or not a capacity necessary for the cleaning processing can be allocated in the RAM 203. For example, in the cleaning processing explained in FIGS. 15A-15C or FIGS. 16A-16D, if a capacity in which all of data of one zone can be stored can be allocated, processing for one zone can be handled by a single data read out, and the processing performance is not caused to be reduced. For this reason, it is determined whether or not at a minimum a capacity for one zone can be allocated in the RAM 203 for example. If at least the free space corresponding to a capacity for one zone cannot be allocated in the RAM 203, the processing proceeds to step S2102.

If, step S2110, it is determined that sufficient free space can be allocated in the RAM 203, the processing proceeds to step S2111, and the cleaning processing explained in, for example, FIGS. 15A-15C or FIGS. 16A-16D is executed. When the cleaning processing has completed in this way, the processing returns to step S2101, and the processing from the setting of the timer is initiated.

In this way, the cleaning processing is executed when an access request to the magnetic disk 210 does not occur consecutively for a predetermined period of time.

FIG. 22 is a flowchart for describing cleaning processing of step S2111 in FIG. 21. Here, explanation will be given for the cleaning processing described with reference to FIGS. 15A-15C and FIGS. 16A-16D.

In step S2201, the controller 201 completely detects the track positions for unused areas of the magnetic disk 210. More specifically, all of physical addresses of the unused areas managed in the HDD management information are extracted and saved into the RAM 203. Next, the processing proceeds to step S2202, and the controller 201 selects one of these zones including an unused area detected in step S2201, and further determines whether or not there is a track written overlappingly (i.e., a track in which valid data is recorded) with respect to the unused area in the selected zone. In a case where there is such a track, it is determined that the cleaning processing is necessary, and the processing proceeds to step S2203; when this is no such track, it is determined that the cleaning processing is not required for the zone, and the processing proceeds to step S2209. In step S2209, the controller 201 determines if it has been determined whether or not the cleaning processing is necessary in step S2202 for all of the zones including unused areas that are cached in step S2201, and if so, the processing completes. In a case where the determination has not completed for all of the zones, the processing returns to step S2202, and the cleaning processing continues.

In step S2203, the controller 201 determines whether or not there is an unused zone (a vacant zone) from which it is possible to evacuate data in the processing target zone in the magnetic disk 210. In a case where it is determined that there is the unused zone, the processing proceeds to step S2204, and the cleaning processing explained in FIGS. 15A-15C is performed. Meanwhile, in a case where this kind of unused zone does not exist, the processing proceeds to step S2206, and the cleaning processing explained in FIGS. 16A-16D is performed.

In step S2204, all of the valid data in the zone selected in step S2202 is read out, and held in the RAM 203. Then the processing proceeds to step S2205, the controller 201 copies the valid data held in the RAM 203 into the unused zone detected in step S2203, and the processing proceeds to step S2208.

On the other hand, in step S2206, all of the valid data of the tracks further sequentially written overlappingly with respect to the unused area within the zone selected in step S2202 is read out and held in the RAM 203. Next, the processing proceeds to step S2207, and the controller 201 sequentially overwrites the unused area of the same zone with the valid data read out into the RAM 203 from the start of the head of the unused area. Then, the processing proceeds to step S2208.

In step S2208, the controller 201 updates a physical address which is the destination of the moved valid data and a physical address of the area which newly becomes unused as logical addresses of the HDD management information respectively. Then, the processing returns to step S2202, and it is determined whether the cleaning processing is necessary for other zones.

In this way, the cleaning processing is repeated for each zone, and the cleaning processing is executed for the magnetic disk 210 as a whole. In the sixth embodiment, explanation was given for a case in which the cleaning processing is not completed until the cleaning processing has run for the magnetic disk 210 on the whole, but configuration may be taken such that interrupt processing for a read/write/deletion command can be performed during the cleaning processing, for example. By doing that, a reduction in the performance of the system is further prevented because processing for accessing the HDD 110 is not made to wait.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-027861, filed Feb. 17, 2014 which is hereby incorporated by reference herein in its entirety.

The invention claimed is:

1. An information processing apparatus for recording data by a shingled magnetic recording (SMR), the information processing apparatus comprising:
   a magnetic storage medium configured to have a storing zone for storing, with SMR, both of deletion target data and data other than the deletion target data, and that has a vacant zone;
   a copy unit configured to, in a case that a deletion of data stored in the storing zone in the magnetic storage medium is instructed, copy the data other than deletion target data stored in the storing zone into the vacant zone in the magnetic storage medium;
   an overwriting unit configured to overwrite a track of the storing zone in which the deletion target data is stored with predetermined data; and
   a registration unit configured to register the track as an unused area,
   wherein the copy unit, the overwriting unit, and the registration unit are implemented by at least one processor and a memory.

2. The information processing apparatus according to claim 1, further comprising:
   a determination unit configured to, based on content registered by the registration unit, determine whether or not there is a defragmentation-target zone including a used area storing the data other than the deletion target data and the unused area; and
   a cleaning unit configured to perform a defragmentation of the defragmentation-target zone,
   wherein the determination unit and the cleaning unit are implemented by the at least one processor and the memory.

3. The information processing apparatus according to claim 2, wherein the cleaning unit,
   after data of the defragmentation-target zone is copied into the vacant zone, registers the defragmentation-target zone as an unused area, or
   performs cleaning by overwriting the unused area of the defragmentation-target zone with the data other than the deletion target data positioned after the unused area in the defragmentation-target zone, and by registering, as an unused area, an area in which the data other than the deletion target data has been overwritten in the defragmentation-target zone.

4. The information processing apparatus according to claim 2, further comprising:
   a time counting unit configured to count a time period over which an access request to the magnetic storage medium continuously does not occur,
   wherein the determination unit and the cleaning unit are activated when the time counting unit counts a predetermined period of time, and
   wherein the time counting unit is implemented by the at least one processor and the memory.

5. The information processing apparatus according to claim 1, wherein the overwriting unit performs overwriting a predetermined number of times.

6. The information processing apparatus according to claim 1, wherein the overwriting unit performs overwriting processing in a complete delete mode for completely deleting data.

7. An information processing apparatus for recording data in a magnetic storage medium by a shingled magnetic recording (SMR), the information processing apparatus comprising:
   a magnetic storage medium configured to have a storing zone for storing, with SMR, both of deletion target data and data other than the deletion target data, and that has a vacant zone;
   a reading unit configured to, in a case that a deletion of data stored in the storing zone in the magnetic storage medium is instructed, read the data other than deletion target data that is positioned after the deletion target data in the storing zone;
   an overwriting unit configured to overwrite, in the storing zone, from a head of the deletion target data, with the non-deletion target data read by the reading unit; and
   a registration unit configured to register, as an unused area, an area, in the storing zone, positioned after an area in which the overwriting unit has overwritten or written with the data other than the deletion target data,
   wherein the reading unit, the overwriting unit, and the registration unit are implemented by at least one processor and a memory.

8. The information processing apparatus according to claim 7, further comprising:
   a deletion unit configured to, in a case where an amount of the data other than deletion target data read by the reading unit is less than an amount of the deletion target data, delete by overwriting with dummy data the deletion target data not overwritten by the overwriting unit,
   wherein the deletion unit is implemented by the at least one processor and the memory.

9. The information processing apparatus according to claim 7, further comprising:
   a deletion unit configured to, in a case where the data other than the deletion target data positioned after the deletion target data in the storing zone does not exist, delete the deletion target data by overwriting with dummy data,
   wherein the second deletion unit is implemented by the at least one processor and the memory.

10. The information processing apparatus according to claim 7, wherein the overwriting unit performs overwriting processing in a complete delete mode for completely deleting data.

11. The information processing apparatus according to claim 10, wherein the complete delete mode is set to a features register in an SATA or ATA standard.

12. The information processing apparatus according to claim 7, further comprising:
- a determination unit configured to, based on content registered by the registration unit, determine whether or not there is a defragmentation-target zone including a used area storing the data other than the deletion target data and the unused area; and
- a cleaning unit configured to perform a defragmentation of the defragmentation-target zone,
- wherein the determination unit and the cleaning unit are implemented by the at least one processor and the memory.

13. A method of controlling an information processing apparatus for recording data in a magnetic storage medium having a storing zone storing both of deletion target data and data other than the deletion target data and a vacant zone by a shingled magnetic recording (SMR), the method comprising:
- copying the data other than the deletion target data in the storing zone into the vacant zone in the magnetic storage medium, in a case that a deletion of data stored in the storing zone in the magnetic storage medium is instructed;
- overwriting a track of the storing zone in which the deletion target data is stored with predetermined data; and
- registering the track as an unused area.

14. A non-transitory computer-readable storage medium storing a program for causing a processor to execute a method of controlling an information processing apparatus for recording data in a magnetic storage medium having a storing zone storing both of deletion target data and data other than the deletion target data and a vacant zone by a shingled magnetic recording, the method comprising:
- copying the data other than the deletion target data in the storing zone into the vacant zone in the magnetic storage medium, in a case that a deletion of data stored in the storing zone in the magnetic storage medium is instructed;
- overwriting a track of the storing zone in which the deletion target data is stored with predetermined data; and
- registering the track as an unused area.

* * * * *